United States Patent
Li et al.

(10) Patent No.: US 12,229,125 B2
(45) Date of Patent: Feb. 18, 2025

(54) SELECTION PUSHDOWN IN COLUMN STORES USING BIT MANIPULATION INSTRUCTIONS

(71) Applicant: Microsoft Technology Licensing, LLC, Redmond, WA (US)

(72) Inventors: Yinan Li, Redmond, WA (US); Badrish Chandramouli, Redmond, WA (US); Jianan Lu, Plainsboro, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/330,103

(22) Filed: Jun. 6, 2023

(65) Prior Publication Data

US 2024/0411756 A1   Dec. 12, 2024

(51) Int. Cl.
*G06F 16/20* (2019.01)
*G06F 16/2453* (2019.01)

(52) U.S. Cl.
CPC ................. *G06F 16/2453* (2019.01)

(58) Field of Classification Search
CPC .................................................. G06F 16/2453
See application file for complete search history.

(56) References Cited

U.S. PATENT DOCUMENTS

| | | | |
|---|---|---|---|
| 2012/0303633 A1 | 11/2012 | He et al. | |
| 2014/0280283 A1* | 9/2014 | Li | G06F 16/24532 707/764 |
| 2017/0091239 A1* | 3/2017 | Bumbulis | G06F 16/245 |
| 2017/0193128 A1* | 7/2017 | Alsubaiee | G06F 16/86 |
| 2018/0075116 A1 | 3/2018 | Nakamura | |

FOREIGN PATENT DOCUMENTS

| | | |
|---|---|---|
| CN | 104361113 A | 2/2015 |
| WO | 2013152543 A1 | 10/2013 |
| WO | 2022016532 A1 | 1/2022 |

OTHER PUBLICATIONS

Wikipedia, X86 Bit manipulation instruction set. Jul. 10, 2021 [retrieved on Apr. 25, 2024]. Retrieved from the Internet: https://web.archive.org/web/20210710035020/https://en.wikipedia.org/wiki/X86_Bit_manipulation_instruction_set (Year: 2021).*

(Continued)

*Primary Examiner* — Kristopher Andersen
(74) *Attorney, Agent, or Firm* — Novo TechIP International PLLC

(57) ABSTRACT

Systems and methods of processing queries for column-oriented database systems involve processing the queries to identify which of values of column data are to be accessed for the query. A select bitmap is then generated having k bits wherein each bit corresponds to one of the values of the column. The select bitmap is generated such that each bit representing a value of the column data that is to be accessed for the query has a first value and each bit representing a value of the column data that is not to be accessed for the query has a second value. Encoded values are then extracted from memory for each of the values represented in the select bitmap by a bit having the first value. The extracted encoded values are decoded to generate decoded query data. The decoded query data is then processed to generate result data.

20 Claims, 9 Drawing Sheets

(56) References Cited

OTHER PUBLICATIONS

"Amazon Athena", Retrieved from: https://aws.amazon.com/athena/, Retrieved Date: Apr. 4, 2023, 7 Pages.
"Amazon S3", Retrieved from: https://aws.amazon.com/s3/, Retrieved Date: Apr. 4, 2023, 8 Pages.
"Ampere Altra Max Cloud Native Arm Server Processors", Retrieved from: https://web.archive.org/web/20230407185459/https://amperecomputing.com/processors/ampere-altra, Retrieved Date: Apr. 4, 2023, 6 Pages.
"Apache Arrow", Retrieved from: https://arrow.apache.org/, Retrieved Date: Apr. 4, 2023, 1 Page.
"Apache ORC", Retrieved from: https://orc.apache.org/, Retrieved Date: Apr. 4, 2023, 2 Pages.
"Apache Parquet", Retrieved from: https://parquet.apache.org/, Retrieved Date: Apr. 4, 2023, 2 Pages.
"AWS Graviton Processor", Retrieved from: https://aws.amazon.com/ec2/graviton/, Retrieved Date: Apr. 4, 2023, 12 Pages.
"Azure Blob Storage", Retrieved from: https://azure.microsoft.com/en-us/products/storage/blobs/, Retrieved Date: Apr. 4, 2023, 7 Pages.
"Azure Synapse Analytics", Retrieved from: https://azure.microsoft.com/en-us/products/synapse-analytics/, Retrieved Date: Apr. 4, 2023, 7 Pages.
"Protocol Buffers", Retrieved from: https://protobuf.dev/, Retrieved Date: Apr. 4, 2023, 1 Page.
"Spark Data Sources", Retrieved from: https://spark.apache.org/docs/latest/sql-data-sources.html, Retrieved Date: Apr. 4, 2023, 2 Pages.
"TPC Who We Are", Retrieved from: https://www.tpc.org/, Mar. 31, 2023, 4 Pages.
Abadi, et al., "Integrating Compression and Execution in Column Oriented Database Systems", In Proceedings of the ACM SIGMOD International Conference on Management of Data, Jun. 27, 2006, pp. 671-682.
Ailamaki, et al., "Weaving Relations for Cache Performance", In Proceedings of the 27th International Conference on Very Large Data Bases, Sep. 11, 2001, 12 Pages.
Armbrust, et al., "Delta Lake: High-Performance ACID Table Storage Over Cloud Object Stores", In Proceedings of the VLDB Endowment, vol. 13, Issue 12, Aug. 21, 2020, pp. 3411-3424.
Armbrust, et al., "Lakehouse: A New Generation of Open Platforms that Unify Data Warehousing and Advanced Analytics", In Proceedings of the 11th Conference on Innovative Data Systems Research, Jan. 11, 2021, 8 Pages.
Armbrust, et al., "Spark SQL: Relational data processing in Spark", In Proceedings of ACM SIGMOD International Conference on Management of Data, May 31, 2015, pp. 1383-1394.
Behm, et al., "Photon: A Fast Query Engine for Lakehouse Systems", In Proceedings of the International Conference on Management of Data, Jun. 12, 2022, pp. 2326-2339.
Boncz, et al., "MonetDB/X100: Hyper-Pipelining Query Execution", In Proceedings of the 2nd Biennial Conference on Innovative Data Systems Research, Jan. 4, 2005, 13 Pages.
Calder, et al., "Windows Azure Storage: A Highly Available Cloud Storage Service with Strong Consistency", In Proceedings of the Twenty-Third ACM Symposium on Operating Systems Principles, Oct. 23, 2011, pp. 143-157.
Dageville, et al., "The Snowflake Elastic Data Warehouse", In Proceedings of the International Conference on Management of Data, Jun. 26, 2016, pp. 215-226.
Durner, et al., "Crystal: A Unified Cache Storage System for Analytical Databases", In Proceedings of the VLDB Endowment, vol. 14, Issue 11, Jul. 1, 2021, pp. 2432-2444.
Estabrook, et al., "Azure Data Lake Storage Query Acceleration", Retrieved from: https://learn.microsoft.com/en-us/azure/storage/blobs/data-lake-storage-query-acceleration, Mar. 9, 2023, 4 Pages.
Feng, et al., "ByteSlice: Pushing the Envelop of Main Memory Data Processing with a New Storage Layout", In Proceedings of the ACM SIGMOD International Conference on Management of Data, May 31, 2015, pp. 31-46.
Hunt, Randall, "S3 Select and Glacier Select—Retrieving Subsets of Objects", Retrieved from: https://aws.amazon.com/blogs/aws/s3-glacier-select/, Nov. 29, 2017, 4 Pages.
Idreos, et al., "MonetDB: Two Decades of Research in Column-oriented Database Architectures", In IEEE Data Engineering, Jan. 2012, 6 Pages.
Jiang, et al., "Boosting Data Filtering on Columnar Encoding with SIMD", In Proceedings of the 14th International Workshop on Data Management on New Hardware, Jun. 11, 2018, 10 Pages.
Johnson, et al., "Row-wise Parallel Predicate Evaluation", In Proceedings of the VLDB Endowment, vol. 1, Issue 1, Aug. 1, 2008, pp. 622-634.
Kandula, et al., "Pushing Data-Induced Predicates Through Joins in Big-data Clusters", In Proceedings of the VLDB Endowment, vol. 13, Issue 3, Nov. 1, 2019, pp. 252-265.
Zaharia, et al., "Resilient Distributed Datasets: A Fault-Tolerant Abstraction for In-Memory Cluster Computing", In Proceedings of the 9th USENIX Conference on Networked Systems Design and Implementation, Apr. 25, 2012, 14 Pages.
Li, et al., "BitWeaving: Fast Scans for Main Memory Data Processing", In Proceedings of the ACM SIGMOD International Conference on Management of Data, Jun. 22, 2013, pp. 289-300.
Li, et al., "Mison: A Fast JSON Parser for Data Analytics", In Proceedings of the VLDB Endowment, vol. 10, Issue 10, Jun. 1, 2017, pp. 1118-1129.
Luszczak, et al., "Databricks Cache Boosts Apache Spark Performance", Retrieved from: https://www.databricks.com/blog/2018/01/09/databricks-cache-boosts-apache-spark-performance.html, Jan. 9, 2018, 9 Pages.
Melnik, et al., "Dremel: Interactive Analysis of Web-Scale Datasets", In Proceedings of the VLDB Endowment, vol. 3, Issue 1, Sep. 13, 2010, pp. 330-339.
Palkar, et al., "Filter Before You Parse: Faster Analytics on Raw Data with Sparser", In Proceedings of the VLDB Endowment, vol. 11, Issue 11, Jul. 1, 2018, pp. 1576-1589.
Polychroniou, et al., "Rethinking SIMD Vectorization for In-Memory Databases", In Proceedings of the ACM SIGMOD International Conference on Management of Data, May 31, 2015, pp. 1493-1508.
Polychroniou, et al., "Towards Practical Vectorized Analytical Query Engines", In Proceedings of the 15th International Workshop on Data Management on New Hardware, Jul. 1, 2019, 7 Pages.
Polychroniou, et al., "VIP: A SIMD Vectorized Analytical Query Engine", In The VLDB Journal, vol. 29, Jul. 13, 2020, pp. 1243-1261.
Poosala, et al., "Selectivity Estimation Without the Attribute Value Independence Assumption", In Proceedings of the 23rd VLDB Conference, vol. 97, Aug. 25, 1997, pp. 486-495.
Sethi, et al., "Presto: SQL on Everything", In Proceedings of the IEEE 35th International Conference on Data Engineering, Apr. 8, 2019, pp. 1802-1813.
Stonebraker, et al., "C-Store: A Column-oriented DBMS", In Proceedings of the 31st VLDB Conference, Aug. 2005, pp. 553-564.
Willhalm, et al., "SIMD-Scan: Ultra Fast in-Memory Table Scan using on-Chip Vector Processing Units", In Proceedings of the VLDB Endowment, vol. 2, Issue 1, Aug. 24, 2009, pp. 385-394.
Willhalm, et al., "Vectorizing Database Column Scans with Complex Predicates", In International Workshop on Accelerating Data Management Systems Using Modern Processor and Storage Architectures, Aug. 26, 2013, pp. 1-12.
Yang, et al., "FlexPushdownDB: Hybrid Pushdown and Caching in a Cloud DBMS", In Proceedings of the VLDB Endowment, vol. 14, Issue 11, Jul. 2021, pp. 2101-2113.
Yu, et al., "PushdownDB: Accelerating a DBMS Using S3 Computation", In Proceedings of the IEEE 36th International Conference on Data Engineering, Apr. 20, 2020, pp. 1802-1805.
International Search Report and Written Opinion received for PCT Application No. PCT/US2024/031521, Sep. 3, 2024, 15 pages.

* cited by examiner mask:0101000100111001
src: 0100110110100101
dest:0000000001011001

(a) PEXT (parallel bit extract)

src: 0000000001011001
dest:0100000100100001
mask:0101000100111001

(b) PDEP (parallel bit deposit)

FIG. 2

|  | v7 v6 v5 v4 v3 v2 v1 v0 |
|---|---|
| input values: | 01011011101101000001001111001010 |
| select bitmap: | 1 1 0 0 0 1 0 0 |
| constant mask: | 00010001000100010001000100010001 |
| step 1: transform the select bitmap to an extended bitmap | |
| low = PDEP(bitmap, mask): | 00010001000000000000000100000000 |
| high = PDEP(bitmap,mask-1): | 00010000000000000001000000000000 |
| extended = high - low: | 11111111000000000000111100000000 |
| step 2: select values based on the extended bitmap | |
| output | v7 v6 v2 |
| PEXT(values, extended): | 010110110011 |

FIG. 3

```
                                                word 2                      (word 1 & 0)
                                     v31v30v29v28v27v26v25v24v23v22v2       1...
input                    values:     1100010111011000000010111011110        ...
                  select bitmap:      1  0  1  0  0  0  0  1  0  0          ...
constant                   mask:     001001001001001001001001001001001      ...
                step 1: transform the select bitmaps to extended bitmaps
       low = PDEP(bitmap,mask):      001000001000000000000001000000000       ...
      high = PDEP(bitmap, mask-1):   000001000000000000001000000000000       ...
              extended = high-low:   111000111000000000001110000000000       ...
                 step 2: select values based on the extended bitmaps
output                                               v31v29v24               ...
         PEXT(values, extended):                     110011011               ...

(word 2)             word 1                           word 0
              ...v2    v20v19v18v17v16v15v14v13v12v11v    v10v9 v8v7 v6v5 v4v3 v2v1 v0
values:        ...    110111001000011101001011000         111010000111001010110010100011
bitmap:        ...     0  0  0  1  0  0  0  0  0  11      1  1  0  0  0  0  0  0  0  0
mask:          ...    001001001001001001001001001011     010010010010010010010010010001
                step 1: transform the select bitmaps to extended bitmaps
   low:        ...    000000001000000000000000000011     010010000000000000001000000000
  high:        ...    000000010000000000000000001000     010000000000000001000000000000
extended:      ...    000000111000000000000000001111     111110000000000001110000000000
                   step 2: select values based on the extended bitmaps
                ...                   v18v17v              v10v9 v3
output:         ...                   001100               110110
```

FIG. 4 column a  bitmap$_a$ = filter(a, null, < 10)

FIG. 5

| | |
|---|---|
| input | v31 v30 v29 v28 ... v3 v2 v1 v0 |
| values: | 11000101101...110010100011 |
| bitmap$_a$: | 1010000100000100000011100001000 |
| step 1: select values from column b (see Figure 4) | |
| | v31 v29 v24 v18 v11 v10 v9 v3 |
| selected = select(values, bitmap$_a$): | 11001101100100011101110 |
| step 2: unpack selected values and evaluate predicate <4 | |
| filtered = eval$_{<4}$(unpack(selected)): | 01110100 |
| step 3: transform the filtered bitmap | |
| output  bitmap$_b$ = PDEP(filtered, bitmap$_a$): | 0010000100000100000001000000000 |

FIG. 6

| | | |
|---|---|---|
| input | values (v): | 0100011010000110011010100100101 0 |
| | literals (l): | 1010101010101010101010101010101 0 |
| constant | mask$_{low}$ (lo): | 0101010101010101010101010101010 1 |
| | mask$_{high}$ (hi): | 1010101010101010101010101010101 0 |
| results = ¬((v⊕l)∨(((v⊕l)∨hi)-lo)): | | 0000001010000010001010100000101 0 |
| output | b$_{valid}$ = PEXT(results,hi): | 000110010111001 1 |

FIG. 9

| | | |
|---|---|---|
| input | b$_{select}$: | 0100000100011000001000 01 |
| | b$_{record}$: | 1011111111100011110111111001110 1 |
| low = PDEP(b$_{select}$, b$_{record}$): | | 0010000010000001100000001000000 1 |
| high = PDEP(b$_{select}$, b$_{record}$-1): | | 1000000100010001000000010000010 0 |
| output | b$_{level}$ = high - low: | 0110000010001111100000010000001 1 |

FIG. 10

| | | |
|---|---|---|
| input | b$_{level}$: | 0110000010001111100000010000001 1 |
| | b$_{valid}$: | 0110000100001111100011001011101 1 |
| output | b$_{value}$ = PEXT(b$_{level}$, b$_{valid}$): | 110011110010001 1 |

FIG. 11

SELECTION PUSHDOWN IN COLUMN STORES USING BIT MANIPULATION INSTRUCTIONS

BACKGROUND

Many database systems store database tables and indices in a row-wise fashion. When data and indices are stored in a row-wise fashion, the values from each row are stored contiguously on a per-row basis. Row-wise data storage is suitable for transactional applications which involve accessing and/or modifying one or a small number of rows (i.e., records) at a time. Row-wise storage, however, is typically not suitable for applications, such as data analytics, that require access to only a few columns over a large number of rows due to the overhead of reading and handling data in columns that are not required by a query.

Column-oriented database systems store database tables by column rather than by row which makes these systems preferable for use in data analytics applications. Because each column can be stored separately, for any query, the system can evaluate which columns are being accessed and retrieve only the values requested from the specific columns. Instead of requiring separate indexes for optimally tuned queries, the data values themselves within each column form the index which reduces the processing requirements and enables rapid access to the data.

The columnar storage of data not only eliminates storage of multiple indexes, views and aggregations, but also facilitates vast improvements in compression, which can result in an additional reduction in storage while maintaining high performance. This compression, however, imposes challenges on query processing as the data must be decoded before it can be further processed. Previous research has explored different methods for reducing the query processing time in column-oriented database systems in order to increase the efficiency of accessing data in column-oriented database systems. One such method involves using predicate pushdown techniques on encoded values to avoid decoding. However, currently known predicate pushdown techniques are restricted to specific encoding schemes and predicates, limiting their practical use.

With the increasing demand for data analytics, there is a critical need for decoding schemes which can increase the speed and efficiency of querying columnar databases.

SUMMARY

In one general aspect, the instant disclosure presents a data processing system having a processor and a memory in communication with the processor wherein the memory stores executable instructions that, when executed by the processor, cause the data processing system to perform multiple functions. The functions include receiving a query to be executed on column data of a column-oriented database, the column data including a number k of values, wherein the values are encoded using a data compression scheme such that each of the values is represented by an encoded value having a number n of bits, each of the encoded values being stored in a predetermined location in the memory; processing the query to identify which of the values of the column data are to be accessed for the query; generating a select bitmap having the number k bits wherein each bit corresponds to one of the values of the column, the select bitmap being generated such that each bit representing a value of the column data that is to be accessed for the query has a first value and each bit representing a value of the column data that is not to be accessed for the query has a second value; extracting the encoded value from the memory for each of the values represented in the select bitmap by a bit having the first value; decoding the extracted encoded values to generate decoded query data; and processing the decoded query data based on the query to generate result data.

In yet another general aspect, the instant disclosure presents a method for accessing column data of a column-oriented database system. The method includes receiving a query to be executed on column data of a column-oriented database, the column data including a number k of values, wherein the values are encoded using a data compression scheme such that each of the values is represented by an encoded value having a number n of bits, each of the encoded values being stored in a predetermined location in a memory; processing the query to identify which of the values of the column data are to be accessed for the query; generating a select bitmap having the number k bits wherein each bit corresponds to one of the values of the column data, the select bitmap being generated such that each bit representing a value of the column data that is to be accessed for the query has a first value and each bit representing a value of the column data that is not to be accessed for the query has a second value; extracting the encoded value from the memory for each of the values represented in the select bitmap by a bit having the first value; decoding the extracted encoded values to generate decoded query data; and processing the decoded query data based on the query to generate result data.

In yet another general aspect, the instant disclosure presents a method of retrieving data from a column-oriented database. The method includes receiving a query to be executed on the column-oriented database, all values in the column-oriented database being encoded, the query including a plurality of operations, the plurality of operations including a first filter operation and at least one other operation to be performed on columns of the column-oriented database; performing the first filer operation on a first column designated by the query. The first filter operation includes performing a first unpack operation on each of the encoded values in the first column to generate a first set of decoded values; and performing a first evaluate operation on each of the decoded values in the first set of decoded values to determine whether the decoded values satisfy a first filter condition and to generate a generate a first select bitmap including a number of bits corresponding to a number of values in the first set of decoded values. Each bit in the first select bitmap has a first value for records having decoded values in the first column that satisfy the first filter condition and a second value for records having decoded values in the first column that do not satisfy the first filter condition. The method includes performing the at least one operation of the plurality of operations on at least a second column of the database. The at least one operation is one of a filter operation and a project operation and includes performing a select operation that selects encoded values from the second column using the first select bitmap such that the encoded values for the records represented by bits in the first select bitmap having the first value are selected; and performing an unpack operation on each of the encoded values selected by the select operation to generate decoded values. The select operation is performed using a parallel bit extract (PEXT) instruction from a Bit Manipulation Instruction (BMI) which extracts bits selected by a select mask operand from a source operand and writes the extracted bits to contiguous low-order bits in a destination. The PEXT instruction is executed for the select operation using the first select bitmap as the select mask operand and a memory location of the second column as the source operand.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 shows examples of PEXT and PDEP operation.

FIG. 3 shows bit-parallel selection on 8 4-bit values using the query processing scheme in accordance with this disclosure.

FIG. 4 shows bit-parallel selection on 32 3-bit values using the query processing scheme in accordance with this disclosure.

FIG. 5 shows operations in evaluating an example query.

FIG. 6 shows selection pushdown on example column b of the example query.

FIG. 9 shows an example of equality comparisons on 16 2-bit definition levels.

FIG. 10 shows an example of transforming a select bitmap to a level bitmap.

FIG. 11 shows an example of transforming a level bitmap to a value bitmap.

DETAILED DESCRIPTION

Figure 1:
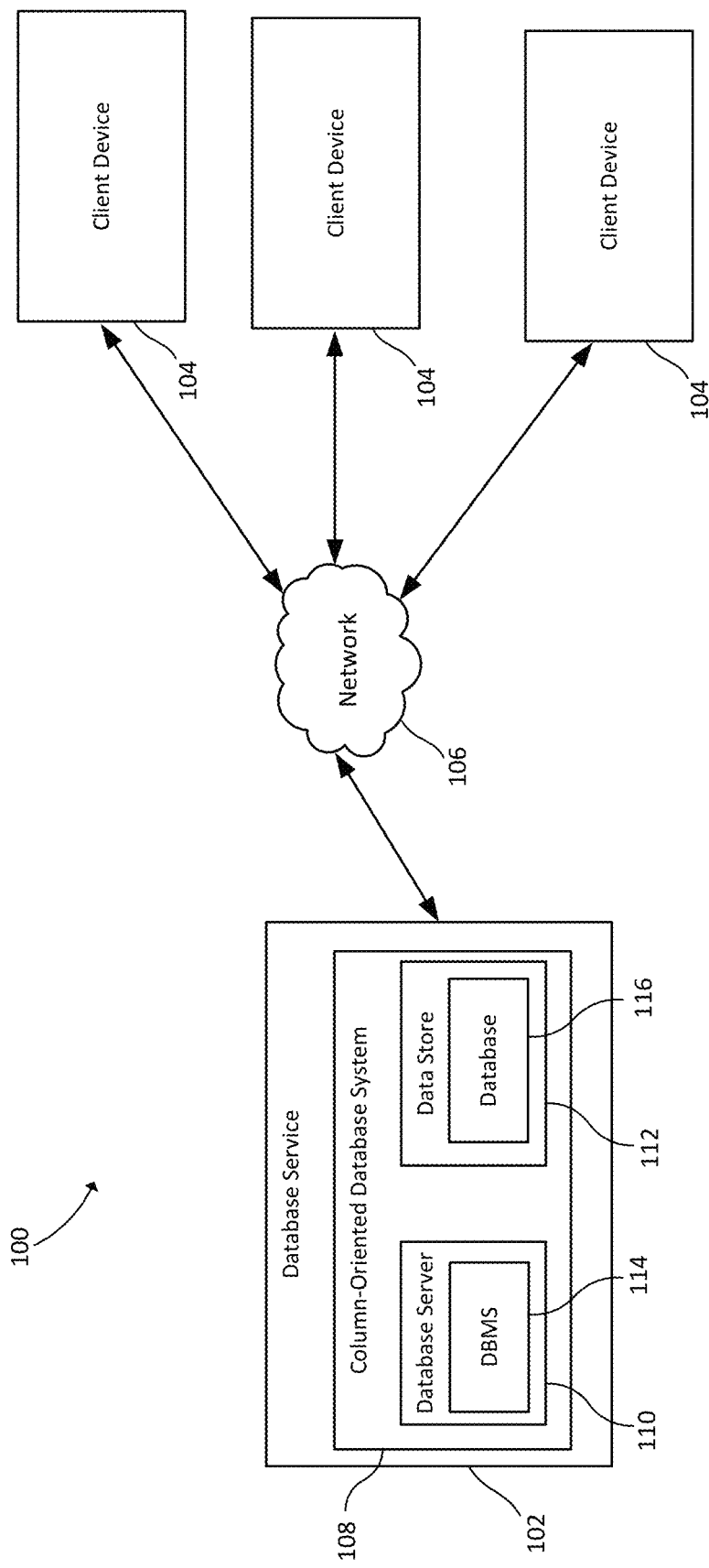
FIG. 1 is a diagram showing an example computing environment in which the techniques disclosed herein may be implemented.

Column-oriented data storage increasingly dominates the analytical database system landscape in this Big Data era. Unlike traditional row-oriented storage formats where tables are stored in a row-by-row manner, such formats employ a columnar storage layout in which values in the same column are stored contiguously. One example of such an approach is Apache Parquet, an opensource column-oriented storage format.

Since consecutive values in the columnar layout are similar to each other, column stores use a variety of aggressive encoding schemes to compress column values. The most widely used encoding scheme is dictionary encoding, where each distinct value in a column is mapped to a unique small code according to a dictionary built for the column. These small codes of column values are usually stored in a bit-packed manner, using as many bits as needed to represent each code. This encoding scheme, though effective in reducing storage cost, imposes challenges on query processing as these codes must be decoded before they can be further processed. As a result, decoding typically dominates the overall query time when working with columnar databases.

Previously known decoding techniques have attempted to accelerate the decoding process by unpacking a group of bit-packed codes in parallel via single instruction, multiple data (SIMD) vectorization. While this approach can reduce decoding time, it has a fundamental limitation: the produced decoded values (e.g., 64-bit integers) are much larger than the input encoded values (typically just a few bits), limiting the degree of data parallelism that can be achieved in this operation.

Another method that has been attempted to reduce decoding time is to minimize the amount of decoding that must be performed for each query by leveraging the idea of predicate pushdown. The basic idea of predicate pushdown is to evaluate a converted predicate on the encoded values directly, essentially pushing down predicate evaluation to avoid the costly decoding. This technique can result in significant performance improvements. However, these techniques rely on two key assumptions: 1) the encoding is order-preserving; and 2) the predicates are simple enough (e.g., basic comparison predicates) such that they can be converted to equivalent ones in the encoded domain. Unfortunately, these two assumptions typically do not hold in practice which limits the applicability of predicate pushdown in many cases. For example, although Parquet makes extensive use of dictionary encoding, the dictionary encoding employed is not order-preserving, which eliminates the possibility of adopting these techniques in Parquet. In addition, even with an order-preserving encoding, many complex predicates, such as string matching, user-defined functions, and cross-table predicates, cannot be supported.

To address these technical problems and more, in an example, this description provides technical solutions in the form of a generic predicate pushdown approach for columnar databases that supports arbitrary predicates without an order-preserving encoding. The approach is based on the observation that a query on a table typically involves multiple predicates across multiple columns. When evaluating a predicate on a column, records failing to meet prior predicates can be bypassed directly. In column stores, this short-circuit optimization can be implemented using a select operator, which selects all values in a given column that satisfy all previous predicates. This approach enables the select operator to be pushed down to directly select encoded values, rather than decoded values, ensuring that only the selected values need to be decoded for full predicate evaluation. For the purposes of this disclosure, this technique is called selection pushdown. With this approach, all relevant values are still decoded first and then evaluated against the original predicates, making this approach applicable for arbitrary predicates. By leveraging selection pushdown, decoding costs can be significantly reduced in comparison to previously known decoding techniques.

The selection pushdown approach utilizes a fast select operator capable of directly extracting selected encoded values from a vector of encoded values packed in a processor word simultaneously without decoding. The fast select operator is based on an instruction set extension to the X86 architecture which is available in nearly all Intel and AMD processors called Bit Manipulation Instructions (BMI). The purpose of these instructions is to accelerate common bitwise operations. Unlike SIMD instruction sets (e.g., AVX2 or AVX512), BMI instructions operate on 64-bit general-purpose registers.

The fast select operator copies all selected values, indicated by a select bitmap, from a vector of bit-packed values to contiguous bits in the output. Using a BMI-based implementation, the fast select operator can process all encoded values packed in a 64-bit processor word using a total of only four instructions, regardless of how many encoded values are packed in a word (e.g., 64 1-bit values, 32 2-bit values, or even 2113 3-bit values), by fully exploiting the parallelism available inside a processor word.

To take full advantage of the fast select operator, a selection pushdown framework is provided for evaluating an arbitrary scan query on a table, which typically involves a sequence of filter and project operations on various columns. In this framework, both filter and project operations take as input a select bitmap generated by previous filter operations and make use of the fast select operator to select encoded values upfront before decoding them. Additionally, each filter operation also needs to refine the select bitmap according to the evaluation of its predicate. To achieve this, specific transformations on the select bitmap are required, because the predicate is evaluated on selected values only and the results must be aligned to the original select bitmap. These transformations can be performed efficiently using BMI.

Modern columnar storage, such as Parquet, offers support for complex structures, including nested and/or repeated structures. Parquet uses two small integers per value to encode structure information. Due to the presence of null or repeated values in each column within complex structures, column values of the same record may not be fully aligned across columns. Consequently, in the selection pushdown framework, an intermediate select bitmap generated by a filter operation on one column cannot be directly applied to another column. Instead, these bitmaps require sophisticated transformations based on the structural information represented by the small integers. A BMI-based implementation enables these encoded small values to be evaluated and bitmaps to be transformed accordingly which in turn enables the framework to be extended to have full support for complex structures in Parquet.

The use of a BMI-based fast select operator, selection framework and complex structure support has enabled a library, referred to herein as Parquet-Select, to be developed that enables predicate pushdown in Parquet. Parquet-Select makes no changes to the Parquet format and can, therefore, read any file conforming to the format specification. Although the techniques are described herein in the context of Parquet, these techniques can be adapted to other on-disk or in-memory columnar storage formats, such as Apache ORC, Apache Arrow, and other internal formats of analytical database systems.

The technical solutions described herein address the technical problem of inefficiencies and difficulties associated with decoding during query processing in columnar databases. By enabling the selection of encoded values upfront, these solutions can significantly reduce the decoding cost in columnar databases, such as Parquet-Select, while at the same time decreasing the selection cost due to the fast selector operator and the selection pushdown framework. The technical solutions described herein therefore significantly increase decoding speed and efficiency relative to previously known techniques.

Referring now to the drawings, FIG. 1 shows an example computing environment 100 upon which aspects of this disclosure may be implemented. Computing environment 100 includes a database service 102 and client devices 104 which communicate with each other via a network 106. The network 106 includes one or more wired, wireless, and/or a combination of wired and wireless networks. In embodiments, the network 106 includes one or more local area networks (LAN), wide area networks (WAN) (e.g., the Internet), public networks, private networks, virtual networks, mesh networks, peer-to-peer networks, and/or other interconnected data paths across which multiple devices may communicate.

The database service 102 is implemented as a cloud-based service or set of services which provides data storage, access, management, and/or security for customers. To this end, database service 102 includes a column-oriented database system 108. Column-oriented database system 108 includes a database server 110 and a data store 112. Database server 110 provides computational resources for implementing the database service 102. The database server 110 is representative of any physical or virtual computing system, device, or collection thereof, such as, a web server, rack server, blade server, virtual machine server, or tower server, as well as any other type of computing system. In embodiments, the database server 110 is implemented in a data center, a virtual data center, or some other suitable facility.

Database server 110 executes one or more software applications, modules, components, or combinations thereof capable of providing the database service to clients, such as client devices. The software applications include a database management system (DBMS) 114 for processing queries, for example, to retrieve, insert, delete, and/or update data in database 102. DBMS 114 supports any suitable database query language, such as Structured Query Language (SQL). Program code, instructions, user data and/or content for the database service 102 is stored in the data store 112. The data store includes one or more storage devices that provide a non-volatile storage volume which is accessible by database server 110. Although a single server 110 and data store 112 are shown in FIG. 1, database service 102 can utilize any suitable number of servers and/or data stores.

A database 116 is implemented in the data store 112. The database 116 organizes data for the database service in a set of tables. Each table is defined by one or more rows which represent records and one or more columns which represent data fields. Database 116 is stored in the data store 112 in a columnar format by the DBMS 114 such that values in the same column are stored contiguously. Storing data in this manner enables the DBMS 114 to implement a strong compression scheme which reduces the disk space requirements for the database 116. Examples of such compression schemes include dictionary-based encoding, run length encoding, hybrid columnar compression, etc.

The client devices 104 enable users to interact with the DBMS 114 to access the data in the database 116. Client devices 104 are computing devices that may be implemented as a portable electronic device, such as a mobile phone, a tablet computer, a laptop computer, a portable digital assistant device, a portable game console, and/or other such devices. Client devices 104 include client applications for communicating with DBMS 114 and accessing the database 116. For example, in embodiments, client devices 104 include an application having a user interface that enables users to input SQL statements for processing by the DBMS.

In embodiments, the database 116 is stored using the Apache Parquet format which is an opensource columnar storage format. In Parquet, each record consists of one or more fields, each of which can be an atomic field or a group field. Group fields contain nested fields, which can recursively be either atomic or group fields. Each field is defined with two types: data type, which specifies the primitive data type such as int32 or byte array, and repetition type, which defines the number of occurrences of the field in its parent group field and can be labeled as one of three types: required (1 time), optional (0 or 1 time), and repeated (>1 times).

To represent complex structure in a columnar representation, Parquet stores two additional integer numbers, called repetition level and definition level, to encode this structural information. For the purpose of this disclosure, repetition and definition levels are used to find: 1) null field values; and 2) the number of repeated values for each record. Field values, repetition and definition levels are compressed independently using common encoding schemes. In particular, Parquet extensively uses a hybrid encoding scheme that adaptively switches between run-length encoding (RLE) and bit-packing encoding: a long run of the same value is stored as a RLE run; other values are encoded in bit-packing runs. Thus, an encoded column typically contains interleaved RLE and bit-packed runs. Repetition and definition levels are directly encoded using this hybrid encoding. Field values, regardless of data types, are first mapped to codes using dictionary encoding, which are then encoded using this hybrid scheme. If the size of the dictionary reaches a certain threshold, Parquet falls back to use the plain encoding. The dictionary used in Parquet is not order-preserving, meaning that most predicates cannot be evaluated on dictionary codes directly.

In Parquet, data is first partitioned into blocks in row-major order, called row-groups. Within each row-group, data is stored contiguously in column-major order. Each root-to-leaf field path in the schema corresponds to a column in a row group, which includes three components: field values, repetition levels, and definition levels. The three components are stored independently in separate data pages. Unnecessary information is never physically stored in Parquet: null values are omitted from the field values; definition levels are not physically stored if the field is a required field; similarly, repetition levels are omitted for non-repeated fields.

The data compression enabled by the use of column-oriented database systems can significantly reduce the storage space required for the database. However, the data must be decoded before it can be further processed. As noted above, data decoding typically dominates the overall query time in column-oriented database systems. To reduce query times for column-oriented database systems, the DBMS 114 is configured to utilize a selection pushdown process that enables the select operator to be pushed down to directly select encoded values, rather than decoded values, ensuring that only the selected values need to be decoded for full predicate evaluation. All relevant values are still decoded first and then evaluated against the original predicates, making this approach applicable for arbitrary predicates. By leveraging selection pushdown, decoding costs can be significantly reduced relatively to previously known decoding techniques.

Selection pushdown is enabled by the implementation of a fast select operator which is capable of directly extracting selected encoded values from a vector of encoded values packed in a processor word simultaneously without decoding. The fast select operator is based on two BMI instructions, namely PEXT and PDEP. The PEXT (parallel bit extract) instruction extracts the bits selected by a select mask operand from a source operand and copies them to the contiguous low-order bits in the destination, with the high-order bits set to 0 s. The PDEP (parallel bit deposit) instruction does the opposite of PEXT: the contiguous low-order bits from the source operand are copied to the selected bits of a destination, indicated by the select mask operand, while other bits in the destination are set to 0 s. FIG. 2 shows examples of PEXT and PDEP on 16-bit operands. For the purposes of this disclosure, bytes are shown and discussed as having a little-endian byte order meaning that the first bit, value, or word is the rightmost one and the last one is the leftmost one.

The select operator takes as input a byte array consisting of n k-bit values and an n-bit select bitmap. It extracts all selected values where their corresponding bits in the select bitmap are 1s and copies them into the contiguous bits in an output byte array, just as if the bits of all unselected values had been removed from the input. FIG. 3 shows the input and the expected output when selecting 3 out of 8 example 4-bit values. As the 3rd, 7th, and 8th bits from the right in the bitmap are 1s, the output should contain v2, v6, and v7. Similarly, an example with 3-bit values is shown in FIG. 4. Note that in this example, as the word size (32) is not a multiple of the bit width (3), some values such as v10 and v21 are placed across the word boundaries, which makes this problem even more challenging.

An obvious solution to this problem would be to scan over all bit-packed values, extracting and gathering selected bit-packed values one at a time, which runs in O(n) instructions. However, considering that each value is typically only a few bits long and much smaller than the processor word (e.g., 64 bits), this implementation does not fully utilize the width of a processor word, thus wasting the parallelism available in processors. To take advantage of the full width of the processor work, a bit-parallel select operator is defined that implements an algorithm, referred to herein as a bit-parallel algorithm, that results in all values being processed simultaneously that are packed into a processor word and moving all selected values to appropriate positions in parallel. The formal definition of a bit-parallel algorithm is given in Definition 1.

Definition 1 [bit-parallel algorithm]. For a given word size w, an algorithm is a bit-parallel algorithm if it processes nk-bit values in $$O\left(\frac{nk}{w}\right)$$

instructions.

A simplified algorithm is suitable for cases where the bit width k of values is a power of 2 such that no value is placed across word boundaries. This algorithm can be extended to support arbitrary bit widths. A special case of the problem is used to illustrate the basic idea behind the algorithm. Suppose that each value has only 1 bit (k=1). In this case, all bits that correspond to 1s in the bitmap need to be extracted. The PEXT instruction from BMI is useful in performing this task by placing the values in the source operand and using the bitmap as the mask operand. This observation can be generalized to handle wider values. For k-bit values, instead of using the select bitmap as the mask operand of PEXT directly, an extended bitmap is needed that uses k bits to represent each bit in the original bitmap, enabling the extraction of all k bits for every selected value. Conceptually, this extended bitmap can be generated by duplicating each bit in the select bitmap k times.

FIG. 3 shows the algorithm to select 3 4-bit values from 8 4-bit values. In FIG. 3, the background color (i.e., shading)

is varied to distinguish adjacent elements corresponding to different values. The algorithm runs in two steps. In the first step, the algorithm converts the input select bitmap 11000100 to an extended bitmap 11111111000000000000111100000000. In step 2, since all corresponding bits of the selected value have been set in the extended bitmap, the extended bitmap is applied and PEXT is used to copy all selected bits to the output, essentially moving only the selected values v7, v6, and v2 to the output.

With BMI, a select bitmap can be converted to the extended bitmap using only three instructions (two PDEP and one subtraction), regardless of the bit width of values. FIG. 3 shows this computation on the example values in step 1. The first PDEP instruction moves each bit in the select bitmap to the rightmost position in the corresponding k-bit field in the extended bitmap, according to the mask $0^{k-1}1 \ldots 0^{k-1}1$ (exponentiation is used to denote the bit repetition, e.g., $1^40^2=111100$). The second PDEP instruction uses a modified mask (mask−1), where the rightmost 1 is removed from mask. As a result, each bit in the select bitmap is now moved to the rightmost position in the next k-bit field in the extended bitmap. Thus, in the result mask high, each moved bit is actually outside its corresponding k-bit field and can be thought of as a "borrowed" bit from the next field. With the two result masks low and high, a subtraction is then performed between the two masks (high-low) to produce an extended bitmap. This last step relies on the propagating of the carries to set all bits between a pair of 1s to 1s, as illustrated below:

$$\text{high: } \overline{100 \ldots 000}^k$$
$$\text{low: } 000 \ldots 001$$
$$\text{high} - \text{low: } 011 \ldots 111$$

Notice that the 1-bit in high prevents carries from propagating to the next k-bit field. As a result, the calculations are safely performed inside each k-bit field and never interfere with each other. Thus, the subtraction acts as if it processes all k-bit fields in parallel.

The abovementioned algorithm is summarized in Algorithm 1 and Algorithm 2. In these algorithms, the extend operator is shown as a separate operator. In addition to the input values and bitmap, the algorithms each take a mask as input. For k-bit values where k is a power of 2, the mask is set to $\text{mask}=0^{k-1}1 \ldots 0^{k-1}1$. If the input contains a large number of values packed into multiple processor words, Algorithm 1 is used on each word and the output is concatenated through bit shifting. The length of the output for each word can be calculated by performing the POPCNT instruction (counting 1s in a processor word) on the input select bitmap.

| Algorithm 1 select (values, bitmap, mask) |
| --- |
| 1: extended := extend(bitmap, mask) |
| 2: return PEXT(values, extended) |

| Algorithm 2 extend (bitmap, mask) |
| --- |
| 1: low := PDEP(bitmap, mask) |
| 2: high := PDEP(bitmap, mask − 1) |
| 3: return high − low |

A general algorithm is realized by extending the simplified algorithm to support an arbitrary bit width k. FIG. 4 shows an example of selecting 8 values from 32 3-bit values that are packed into 3 32-bit words. Since the bit width k=3 is not a power of 2, there are values (v10 and v21) placed across word boundaries. The key challenge of the general algorithm lies in dealing with these partial values with minimal overhead.

It was observed that Algorithm 1 remains valid even for words containing partial values, as long as the masks meet the two requirements shown as follows. First, the mask needs to be shifted to be aligned with the layout of the word. In FIG. 4, the mask in word 2 is left shifted by 2 bits, as there are 2 remaining bits in the partial value v21 in word 2. Similarly, the mask in word 1 is left shifted by 1 bit to accommodate the 1 remaining bit of v10 in word 1. Second, the least significant bit in a mask must be 1, even though it corresponds to a bit in the middle of a value. For a word with a partial value on the right end, this extra 1 at the rightmost position ensures that the subtraction instruction is able to generate a sequence of 1s for the partial value in the extended bitmap. For example, in FIG. 4, the rightmost bit of mask in word 1 is set to 1 though it corresponds to the third bit of v10. This extra 1-bit guides the first PDEP instruction to move the rightmost bit from the select bitmap to the rightmost position in low, which then results in the expected 1-bit on the right end of the extended bitmap.

In general, Algorithm 3 shows the steps to generate masks for an arbitrary word size w and bit width k. For a given w and k, w values are placed in one group that spans over k processor words. It is clear that the words at the same position in these groups can use the same mask as they share the same layout of values. As a result, only k masks need to be generated, one for each word in a group. These masks are always pre-created and reused repeatedly.

| Algorithm 3 generate_masks (w, k) |
| --- |
| 1: masks := ∅ |
| 2: for i := 0 to k do |
| 3:     offset := k − (i × w) % k |
| 4:     masks.add(($0^{k-1}1 \ldots 0^{k-1}1$ << offset) ∨ 1) |
| 5: return masks |

With this approach, the general algorithm needs to run the same four instructions described in Algorithm 1 and 2 on each word which does not introduce any additional overhead compared to the simplified algorithm. It is also worth noting that the simplified algorithm is a specialization of the general algorithm. When the bit width k is a power of 2, the general algorithm will generate the same mask for all words in a group and the mask generated by Algorithm 3 is identical to the one described in Section 3.2. According to Definition 1, the proposed algorithm is clearly a bit-parallel algorithm since it runs a constant number of instructions on each processor word, regardless of the bit width of values or the selectivity of the select bitmap.

The fast select operator described above enables the implementation of a selection pushdown framework which is facilitated by BMI. The framework aims to accelerate arbitrary scan queries by making the best use of the select operator. A scan query returns the values of the projection columns (i.e., in the SELECT clause) from the records that match the filters on a list of filter columns (i.e., in the WHERE clause). For the sake of simplicity, it is first assumed that the WHERE clause is a conjunction of filters, which is the most common case. As discussed below, this assumption can be relaxed to extend the framework to allow conjunctions, disjunctions, negations, or an arbitrary Boolean combination of them.

The framework is built upon a simple yet crucial observation: when performing a filter or project operation, records failing to meet prior predicates can be bypassed directly. While this observation is undeniably obvious, previous approaches have not leveraged it effectively. Indeed, in the case of filter operations, previous work tends to perform predicate evaluation on all values, intentionally ignoring the fact that some values might have been filtered by prior filters. This is primarily because the additional cost associated with the select operator often outweighs the potential savings in predicate evaluation. However, given the fast select operator that operates on encoded values as described above, values can be selected upfront, even for filter operations. Consequently, the framework is designed to take full advantage of the BMI-based select operator in both project and filter operations.

In this framework, each filter operation produces a select bitmap as the output, which uses one bit per record to indicate if the corresponding record matches all filters that have been evaluated so far. The select bitmap can be fed into the next filter operation or the remaining project operations to accelerate the subsequent operations.

To facilitate the following discussion, an example query is used. The query is shown below:

SELECT c FROM R WHERE a<10 and b<4.

FIG. 5 shows the input and output of each operation to evaluate the example query. The query is converted as a filter operation on column a, followed by another filter operation on column b, and ended with a project operation on column c. The first filter must read all column values and, thus, has no input select bitmap. The produced bitmap, bitmap a, is then passed to the second filter operation that now can skip the values in records that fail to satisfy the first predicate. The second filter operation refines the select bitmap according to the predicate on column b, resulting in an updated bitmap, bitmap b, with 4 bits set to 1. Finally, bitmap b is passed to the project operation as an input to select values in column c from matching records.

In the selection pushdown framework, filter and project operations can be implemented by composing four basic operators, as shown below:

Select. As the first step, the select operator is used to remove irrelevant values from the target column. Pushing down the select operator results in a reduced number of values that need to be passed to the subsequent operators. This step can be skipped if the filter or project operation has no input select bitmap (e.g., the first filter in a query).

Unpack. Next, the unpack operator is used to convert the encoded values to their native representation in primitive data types. In this case, the state-of-the-art SIMD-based implementation is adopted for this operator. For project operations, the unpacked results are returned and the remaining two operators/steps can be skipped.

Evaluate. For filter operations, decoded values are evaluated with the filter predicate and generate a bitmap to indicate whether each (selected) value satisfies the predicate. Since all column values have been unpacked and decoded, this operator allows arbitrary predicates. Furthermore, since (selected) column values are now stored in primitive data types, this enables a more straightforward implementation of predicate evaluation using SIMD vectorization.

Transform. The bitmap produced by an evaluate operator may not be directly used as a select bitmap for the next operation. This is because the bitmap has as many bits as the selected records, rather than all records. The transform operator is designed to convert such a bitmap into an appropriate select bitmap that can be used for the subsequent operation(s). An efficient way to implement this operator using BMI is explained below.

As an example, Table 1 shows the steps of the example filter and project operations. The first filter operation is implemented as an unpack operator followed by an evaluate operator. The select and transform operators are avoided because this is the first filter and has to read all values. In contrast, the second filter operation performs all four operators: it pre-selects the values based on bitmap a, which, however, requires an additional bitmap transformation at the end of this operation. The refined bitmap, bitmap b, is then used to accelerate the project operation on column c, which is implemented as a select operator followed by an unpack operator.

TABLE 1

Implementation of example filter and project operations

| column a | filter(a, null, < 10) = evaluate<10(unpack(a)) |
|---|---|
| column b | filter(b, bitmapα, < 4) = <br> transform( <br> evaluate<4(unpack(select(b, <br> bitmapα))), <br> bitmapα) |
| column c | project(c, bitmapb) = unpack(select(c, bitmapb)) |

To demonstrate the need for the transform operator, the filter operation on column b is walked through in the running example. FIG. 6 breaks down the key steps of this operation. As the first step, the filter operation applies bitmap a, i.e., the bitmap generated by the filter on column a, and selects 8 values (v3, v9-11, v18, v24, v29, v31) that pass the first filter (see FIG. 4 for detailed steps). Next, these 3-bit encoded values are unpacked and all decoded values are evaluated, producing an 8-bit bitmap called filtered (step 2). However, this bitmap indicates whether each selected value, rather than any value, in the column satisfies the predicate, and thus needs to be transformed in order to be used as a select bitmap for the next operation(s).

To transform the filtered bitmap, the bits in filtered need to be deposited to the bit positions corresponding to the selected values in the select bitmap$_a$ (i.e., the 1s in bitmap$_a$). In other words, the i-th 1 in the select bitmap needs to be replaced with the i-th bit in filtered, while retaining all 0 s in the select bitmap at their original bit positions. The BMI instruction PDEP is useful in performing this task. The PDEP instruction can use filtered as the source operand and the select bitmap as the mask operand (See, e.g., FIG. 2). Continuing the example from FIG. 6 (step 3), the first (rightmost) 1 in bitmap$_a$ is replaced by the first (rightmost) bit 0 from filtered, indicating that the first selected value v3 does not pass the predicate on column b. The use of PDEP enables all 8 bits from filtered to be moved to appropriate positions in the select bitmap in parallel.

Thus far, it has been assumed that all filters are evaluated in the same order as specified in the query. Next, the query optimization problem of determining the order of filters is addressed. Unlike traditional filter ordering problems, this problem requires the consideration of both filter selectivity and the bit width of columns, both of which affect scan performance. To solve this problem, a cost model is developed and a simple, yet efficient greedy algorithm is utilized to determine the best order. For simplicity, it is assumed that filter predicates are independent of each other, and the selectivity of each filter is pre-known, e.g., via selectivity estimation techniques which are known in the art.

For the cost model, let k denote the bit width, w denote the processor word size, and s denote the selectivity where $s \in [0, 1]$. Assume a sequence of n filters, $f_1 \ldots f_n$, the objective is to minimize the cost of running the filter sequence. The cost of any filter (except the first filter $f_1$) is the sum of the cost to run the select operator on all k-bit values and the cost to unpack and evaluate selected values and the cost to transform the bitmap. According to Definition 1, runtime is positively correlated with the bit width. Thus, the cost of select for a filter $f_1$ is $\propto_w^{k_i}$. The unpack and evaluate operators run on some subset of values that have been filtered by all prior filters. The number of values that any filter will unpack and evaluate equals to the total number of values multiplied by the product of selectivity of all prior filters. Thus, the cost of unpack and evaluate for a filter $f_i$ is $$\propto \left( \frac{k_i}{w} + \prod_{j=1}^{i-1} s_j \right).$$

The cost of transform can be ignored as it uses only one PDEP instruction. Finally, the cost of a filter $f_i$ in a sequence (except the first filter $f_1$) is $$\propto \left( \frac{k_i}{w} + \prod_{j=1}^{i-1} s_j \right).$$

The first filter $f_1$ does not use transform operators, but it needs to unpack and evaluate all values. Putting all these pieces together, the cost of $f_1 \ldots f_n$ is given by:

$$\text{cost } (f_1) + \sum_{i=2}^{n} \text{cost } (f_i) \propto 1 + \sum_{i=2}^{n} \left( \frac{k_i}{w} + \prod_{j=1}^{i-1} s_j \propto \sum_{i=2}^{n} \prod_{j=1}^{i-1} s_j \right) \quad (1)$$

For a set of n filters, the goal is to find a sequence with the lowest cost as defined in Equation 1. Two key observations from Equation 1 can significantly prune the search space: 1) for sequences starting with the same filter, the term $$\sum_{i=2}^{n} \frac{k_i}{w}$$

in Equation 1 remains unchanged and does not impact the overall cost, regardless of the order of the rest of the filters; and 2) to minimize the second term $\Sigma_{i=2}^{n} \Pi_{j=1}^{i-1}$ all filters should be sorted in ascending order of selectivity, assuming the first filter has been determined.

Based on these observations, it becomes evident that a simple greedy approach can find the optimal order. First, an arbitrary filter is selected as the first filter. The optimal order of the remaining filters can then be found by sorting them in the ascending order of their selectivity, whose cost can be calculated by using Equation 1. All n possible choices for the first filter can then be compared to find the one with the lowest overall cost. This approach drastically reduces the search space from O(n!) to O(n) candidate sequences, and the obtained order is optimal under the aforementioned assumptions.

As noted above, the framework can be extended to allow conjunctions, disjunctions, negations, or an arbitrary Boolean combination of them. To accomplish this, each disjunction in the WHERE clause is converted to a combination of conjunctions and negations by applying De Morgan's laws: $a \lor b = \neg(\neg a \land \neg b)$. To support negations, a Boolean flag, namely negate, is added as an additional input parameter to the filter operation. If this flag is true, the bitmap produced by the evaluate operator is flipped, e.g., by performing bitwise negation. All other operators within a filter operation remain unchanged. With this approach, the framework supports disjunctions and negations with negligible overhead.

The techniques described above are general techniques that can be applied to most column stores. The following section describes how the general techniques can be adapted and extended to enable selection pushdown in Apache Parquet. Each column value in Parquet is a triple: (repetition level, definition level, field value). Repetition and definition levels are metadata that is used to represent complex structure in a columnar manner. A select operation in Parquet takes as input a column that includes encoded repetition and definition levels as well as field values, and a bitmap indicating the records to be selected, and outputs the repetition/definition levels and the field values of all selected records, as if the standard reader is used to read a Parquet file that contains the matching records only.

The challenge arises from the way that Parquet encodes the structure information to represent optional, nested, or repeated fields. As Parquet never explicitly stores null values and all repeated values are stored contiguously in the same array, the number of levels or values in the column may not be the same as the number of records, meaning that the select operation described above needs to be modified for use with Parquet. In particular, the input select bitmap described above needs to be transformed to bitmaps that can be applied to the field values and repetition/definition levels of Parquet. This transformation requires the knowledge of the structure of data, which is represented by repetition and definition levels. To simplify the following discussion, two simple facts are used. The first fact (which is indicated by the symbol ①) is that a column value is null if its definition level is not equal to the maximum definition level of the column. The second fact (which is indicated by the symbol ②) is that a column value belongs to the same record of the previous column value if its repetition level is not 0.

Figure 7:
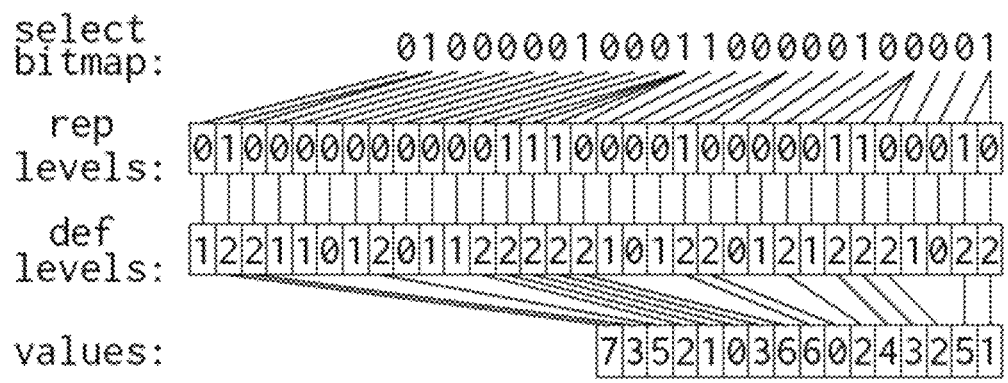
FIG. 7 shows an example of selecting a repeated column in Parquet.

FIG. 7 shows an example repeated column that contains 32 column values belonging to 24 records. Each column value has one definition level and one repetition level so there are 32 definition/repetition levels. The mapping between levels and records can be built by looking at the repetition levels according to ②: the 1st and 2nd levels belong to the first record as the 2nd repetition level is non-0; the 2nd and 3rd records have only one value; the next three levels all belong to the 4th record, etc. Half of the 32 column values have a definition level that is not equal to 2 (the maximum definition level in this column), meaning that there are 16 null values (①). These null values are not explicitly stored in the field values. As a result, even though the column contains 32 column values, it has only 16 non-null field values stored in the value array. In FIG. 7, a 24-bit select bitmap is also included. Each bit in the bitmap indicates whether each record, i.e., all column values belonging to the record, need to be selected. Each bit in the select bitmap is connected to the corresponding repetition and definition levels, and the non-null field value in solid lines. Thus, a level or value needs to be included in the selected column if and only if it is connected to a 1 in the select bitmap.

Figure 8:
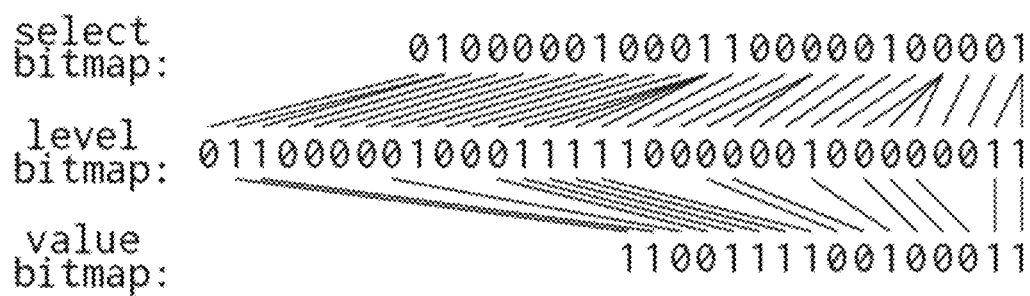
FIG. 8 shows an example of transformation on a select bitmap.

Algorithm 4 shows the workflow to select repetition/definition levels and field values from a Parquet column based on a select bitmap. The basic idea of the algorithm is to transform the input select bitmap to two auxiliary select bitmaps, called level bitmap and value bitmap, that can be used to select the definition/repetition levels and values, respectively. The level bitmap is generated by copying each bit in the select bitmap as many times as the number of levels in the corresponding record. Then, the value bitmap can be created by removing the bits corresponding to null values from the level bitmap. FIG. 8 illustrates the transformations from the select bitmap to the level and value bitmaps for the example column.

---
Algorithm 4 select-parquet (reps, defs, values, b select)
---
1: $b_{level} := b_{select}$
2: selected_reps := Ø
3: if reps # Ø then
4:     $b_{record}$ := equal(reps, 0)
5:     $b_{level}$ := extend($b_{select}$, $b_{record}$)
6:     selected_reps := select(reps, $b_{level}$)
7: $b_{value}$ := $b_{level}$
8: selected_defs := Ø
9: if defs # Ø then
10:     $b_{valid}$ := equal(defs, max_def_level)
11:     $b_{value}$ := compress($b_{level}$, $b_{valid}$)
        selected_defs := select(defs, $b_{level}$)
12: selected_values := select(values, $b_{value}$)
13: return (selected_reps, selected_defs, selected_values)

In the first part of the algorithm (Lines 1-5), the level bitmap for selecting the repetition and definition levels is produced. These steps can be skipped for the simple cases where the column has no repeated values because the input select bitmap can be reused directly (Line 1) as the number of levels matches the number of records. To produce the level bitmap, a bitmap called record bitmap is generated by finding the first levels of all records, i.e., all repetition levels that are 0 s (②) (Line 4). The input select bitmap is then extended to the level bitmap using the produced record bitmap (Line 5). A bit-parallel operator for the former step and a way to reuse an existing operator (extend) for the latter step are discussed in more detail below. With the produced level bitmap that has been aligned to the levels, the select operator described above can be used to select both repetition levels (Line 6) and definition levels (Line 12).

Similarly, to accommodate the fact that all null values are not physically stored in the field values, a value bitmap needs to be generated (Line 7-11). According to ①, all null values can be found by comparing the definition levels to the maximum definition level of the column (Line 10). The result bitmap, called valid bitmap, is then used to compress the input select bitmap, by removing all bits that correspond to null values (Line 11). Finally, the field values are selected by using the value bitmap as the select bitmap (Line 13). All selected field values are then returned along with the repetition/definition levels. Note that for the arguably most common cases where the column is simply a required column, all bitmap transformations are not needed, and only the field values are selected. In this case, the Parquet select operator is reduced to the standard select operator described above.

It is worth noting that, according to Definition 1, all operators used in Algorithm 4 are bit-parallel algorithms. Additionally, all operators rely on either the PDEP or PEXT instruction to achieve the full data parallelism available in processor words.

To enable predicate pushdown on all levels, a bit-parallel equal operator is used to compare a sequence of bit-packed values to a constant value and output an equality bitmap. The bit-parallel equal operator operates on encoded values directly and thus evaluates all values packed in a processor word in parallel. This operator is used to find: 1) all definition levels that are equal to the maximum definition level (①); and 2) all repetition levels that are 0 s (②①). In Parquet, repetition and definition levels are small integer values that are typically encoded with no more than a few bits. Consequently, applying this operator on levels is remarkably efficient due to the high degree of data parallelism.

Algorithm 5 shows the steps to perform bit-parallel comparisons. For k-bit levels, the first step is to duplicate the literal value to all k-bit fields. In the next step, we use a formula to compare all k-bit values simultaneously. The results are stored in the most significant bit of each k-bit field. A value of 1 is used to signify that the two values are the same. These result bits are then extracted by using the PEXT instruction to generate a compact bitmap representation.

---
Algorithm 5 equal(values, literal)
---
1: $mask_{low}$ := $0^{k-1}1 \ldots 0^{k-1}1$
2: $mask_{high}$ := $10^{k-1}1 \ldots 10^{k-1}1$
3: literals := $mask_{low}$ × literal
4: results := ¬((values ⊕ literals) $\lor$
5:         ((values ⊕ literals) $\lor$ $mask_{high}$) − $mask_{low}$
6: return PEXT(results, $mask_{high}$)

FIG. 9 shows an example of comparing the first 16 2-bit definition levels in the running example to the maximum definition level (2). The results are the first 16 bits of the valid bitmap $b_{valid}$, which indicates non-null values in the column.

The upper part of FIG. 8 illustrates the transformation from the select bitmap to the level bitmap. Each bit in the select bitmap is transformed by duplicating it as many times as the number of values in the corresponding record. This transformation can be implemented by using the extend operator (Algorithm 2) described above. In the select operator, for k-bit values, the extend operator is used to copy each bit in the bitmap to k bits by using a specific predefined bitmap 0k–11 . . . . 0k–11 as the mask. In general, the extend operator duplicates the i-th bit in the input k times, where k denotes the distance between the i-th 1 and (i+1)-th 1 in the mask bitmap. By performing the equality comparisons between the repetition levels and 0 s, the record bitmap is generated in which each 1-bit represents the first value in each record (according to (②)). Thus, the distance between each pair of adjacent 1s represents the number of values in the corresponding record. Based on this finding, the select bitmap can be extended by using the record bitmap as the mask of the extend operator, duplicating each bit k times where k is the number of values in the corresponding record. The result bitmap is the level bitmap. FIG. 10 demonstrates the steps of this transformation for the example described above. In FIG. 10, background shading is varied to distinguish values or bits in different records.

As described above, Parquet does not explicitly store null values in the field values. Consequently, to produce a bitmap that can be used to select field values, all bits from the level bitmap corresponding to non-null values need to be extracted. This transformation is illustrated in the lower part of FIG. 8. As the valid bitmap was generated by comparing the definition levels, this transformation can be implemented by applying PEXT on the level bitmap with the use of the valid bitmap as the mask. FIG. 11 demonstrates that a single PEXT instruction transforms the level bitmap $b_{level}$ to the value bitmap $b_{value}$, removing all bits in $b_{level}$ that correspond to 0 s in $b_{valid}$. The produced $b_{value}$ is then used to select the non-null values from the example column.

Parquet-Select enables predicate pushdown in Apache Parquet and is the full implementation of the techniques described herein. Parquet-Select makes no changes to the Parquet format and can, therefore, read any file conforming to the format specification. It is designed to support arbitrary filters where each filter is a user-defined lambda function and can be used to implement even the most complex predicates such as complex string matching. UDFs, or cross-table predicates. For a given set of filters, Parquet-Select returns only the values in the matching records, as if the standard Parquet library is used to read a Parquet file that contains the matching records only. Parquet-Select supports all data types available in Parquet, i.e., Boolean, int32, int64, int96, float, double, byte array, and fixed-length byte array. It also inherits the data model from Parquet, supporting arbitrary nesting of required, optional, and repeated fields.

Figure 12:
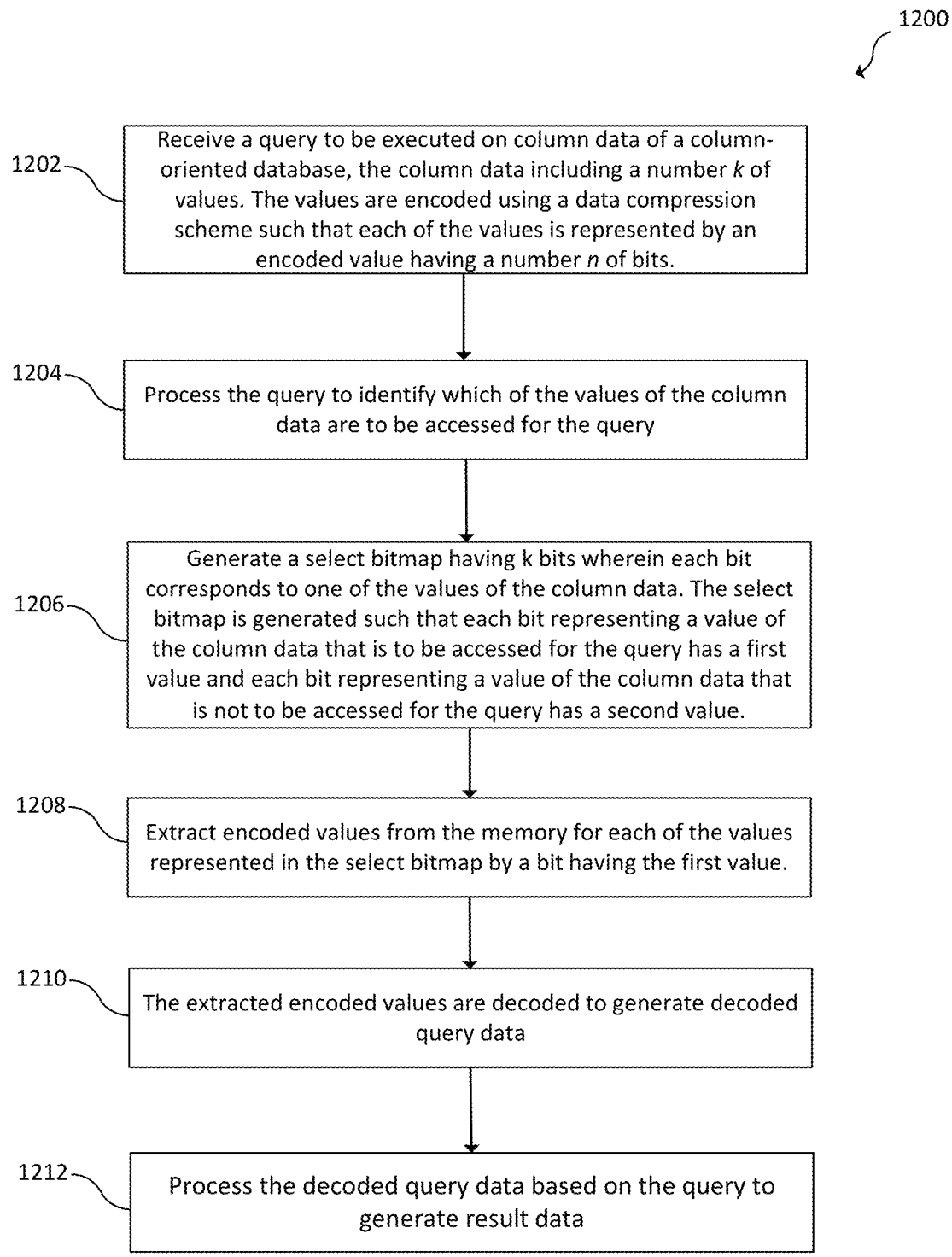
FIG. 12 is a flow diagram of a method of processing queries for a column-oriented database system.

Referring now to FIG. 12, a flow diagram depicting an example method 1200 for processing queries for a column-oriented database system is shown. The method 1200 includes receiving a query to be executed on column data of the column-oriented database (block 1202). The column data includes a number k of values. The values are encoded using a data compression scheme such that each of the values is represented by an encoded value having a number n of bits. Each of the encoded values is stored in a predetermined location in a memory. The query is processed to identify which of the values of the column data are to be accessed for the query (block 1204). A select bitmap is then generated having k bits wherein each bit corresponds to one of the values of the column (block 1206). The select bitmap is generated such that each bit representing a value of the column data that is to be accessed for the query has a first value and each bit representing a value of the column data that is not to be accessed for the query has a second value. The encoded values are then extracted from the memory for each of the values represented in the select bitmap by a bit having the first value (block 1208). The extracted encoded values are decoded to generate decoded query data (block 1210). The decoded query data is then processed based on the query to generate result data (block 1212).

Figure 13:
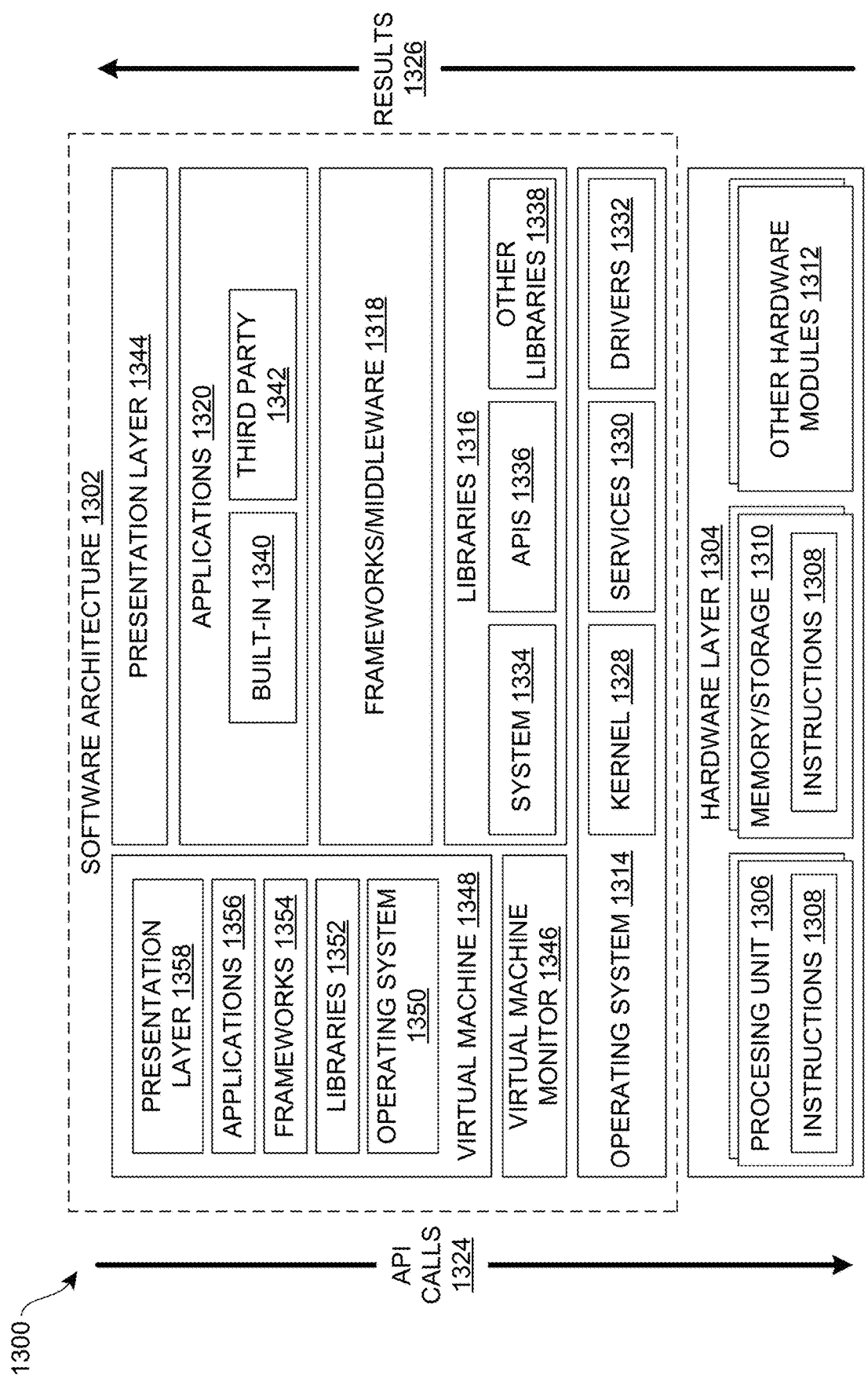
FIG. 13 is a block diagram of an example computing device, which may be used to provide implementations of the mechanisms described herein.

FIG. 13 is a block diagram 1300 illustrating an example software architecture 1302, various portions of which may be used in conjunction with various hardware architectures herein described, which may implement any of the above-described features. FIG. 13 is a non-limiting example of a software architecture and it will be appreciated that many other architectures may be implemented to facilitate the functionality described herein. The software architecture 1302 may execute on hardware that includes, among other things, document storage, processors, memory, and input/output (I/O) components. A representative hardware layer 1304 is illustrated and can represent a computing device. The representative hardware layer 1304 includes a processing unit 1306 and associated executable instructions 1308. The executable instructions 1308 represent executable instructions of the software architecture 1302, including implementation of the methods, modules and so forth described herein. The hardware layer 1304 also includes a memory/storage 1310, which also includes the executable instructions 1308 and accompanying data. The hardware layer 1304 may also include other hardware modules 1312. Instructions 1308 held by processing unit 1306 may be portions of instructions 1308 held by the memory/storage 1310.

The example software architecture 1302 may be conceptualized as layers, each providing various functionality. For example, the software architecture 1302 may include layers and components such as an operating system (OS) 1314, libraries 1316, frameworks 1318, applications 1320, and a presentation layer 1344. Operationally, the applications 1320 and/or other components within the layers may invoke API calls 1324 to other layers and receive corresponding results 1326. The layers illustrated are representative in nature and other software architectures may include additional or different layers. For example, some mobile or special purpose operating systems may not provide the frameworks/middleware 1318.

The OS 1314 may manage hardware resources and provide common services. The OS 1314 may include, for example, a kernel 1328, services 1330, and drivers 1332. The kernel 1328 may act as an abstraction layer between the hardware layer 1304 and other software layers. For example, the kernel 1328 may be responsible for memory management, processor management (for example, scheduling), component management, networking, security settings, and so on. The services 1330 may provide other common services for the other software layers. The drivers 1332 may be responsible for controlling or interfacing with the underlying hardware layer 1304. For instance, the drivers 1332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1316 may provide a common infrastructure that may be used by the applications 1320 and/or other components and/or layers. The libraries 1316 typically provide functionality for use by other software modules to perform tasks, rather than rather than interacting directly with the OS 1314. The libraries 1316 may include system libraries 1334 (for example, C standard library) that may provide functions such as memory allocation, string manipulation, file operations. In addition, the libraries 1316 may include API libraries 1336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1316 may also include a wide variety of other libraries 1338 to provide many functions for applications 1320 and other software modules.

The frameworks 1318 (also sometimes referred to as middleware) provide a higher-level common infrastructure that may be used by the applications 1320 and/or other software modules. For example, the frameworks 1318 may provide various graphic user interface (GUI) functions, high-level resource management, or high-level location services. The frameworks 1318 may provide a broad spectrum of other APIs for applications 1320 and/or other software modules.

The applications 1320 include built-in applications 1340 and/or third-party applications 1342. Examples of built-in applications 1340 may include, but are not limited to, a contacts application, a browser application, a location application, a media application, a messaging application, and/or a game application. Third-party applications 1342 may include any applications developed by an entity other than the vendor of the particular platform. The applications 1320 may use functions available via OS 1314, libraries 1316, frameworks 1318, and presentation layer 1344 to create user interfaces to interact with users.

Some software architectures use virtual machines, as illustrated by a virtual machine 1348. The virtual machine 1348 provides an execution environment where applications/modules can execute as if they were executing on a hardware machine (such as the machine 1400 of FIG. 14, for example). The virtual machine 1348 may be hosted by a host OS (for example, OS 1314) or hypervisor, and may have a virtual machine monitor 1346 which manages operation of the virtual machine 1348 and interoperation with the host operating system. A software architecture, which may be different from software architecture 1302 outside of the virtual machine, executes within the virtual machine 1348 such as an OS 1350, libraries 1352, frameworks 1354, applications 1356, and/or a presentation layer 1358.

Figure 14:
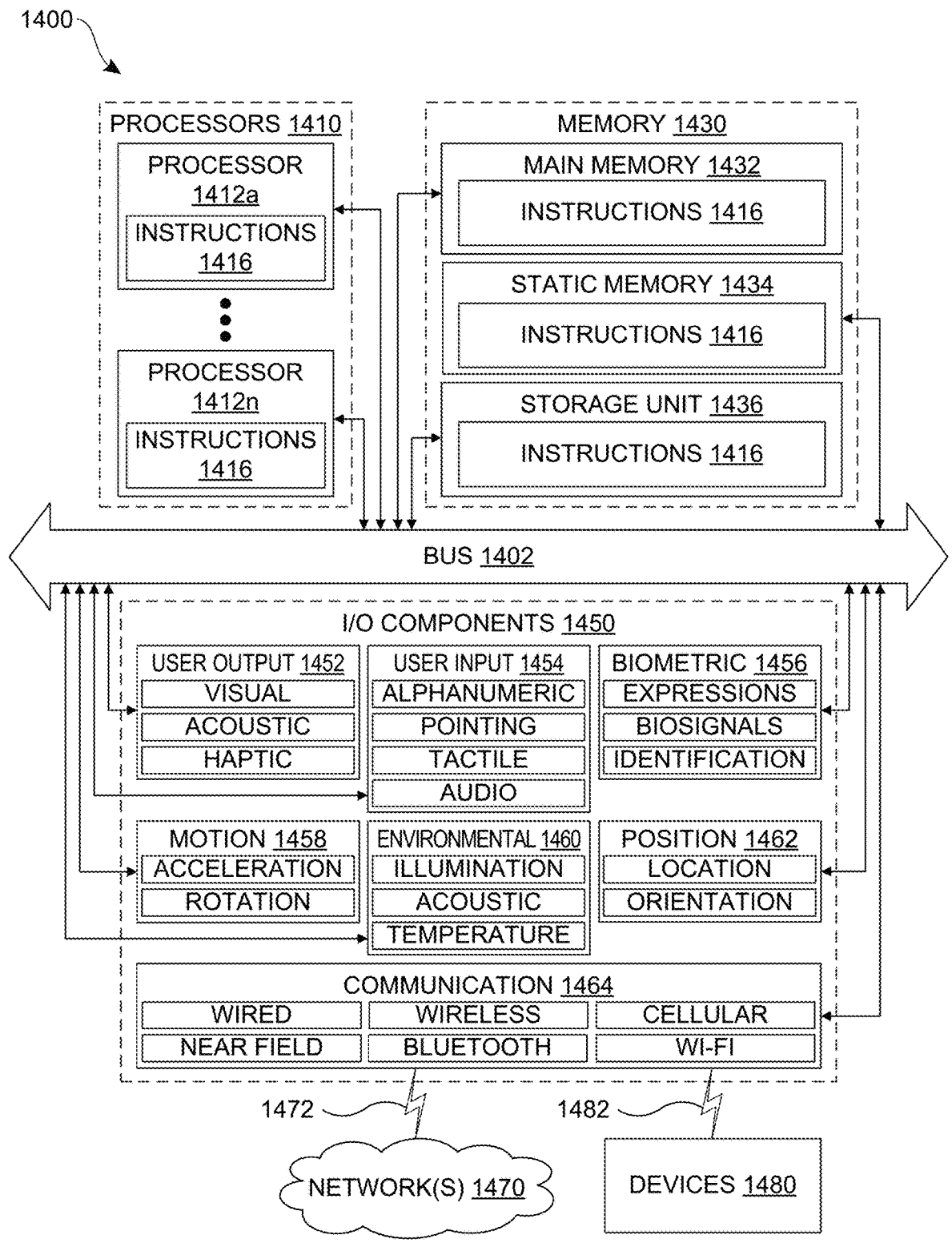
FIG. 14 is a block diagram illustrating components of an example machine configured to read instructions from a machine-readable medium.

FIG. 14 is a block diagram illustrating components of an example machine 1400 configured to read instructions from a machine-readable medium (for example, a machine-readable storage medium) and perform any of the features described herein. It is to be understood that the phrase "machine-readable medium" and "computer-readable medium" are interchangeable in their usage herein. The example machine 1400 is in a form of a computer system, within which instructions 1416 (for example, in the form of software components) for causing the machine 1400 to perform any of the features described herein may be executed. As such, the instructions 1416 may be used to implement modules or components described herein. The instructions 1416 cause unprogrammed and/or unconfigured machine 1400 to operate as a particular machine configured to carry out the described features. The machine 1400 may be configured to operate as a standalone device or may be coupled (for example, networked) to other machines. In a networked deployment, the machine 1400 may operate in the capacity of a server machine or a client machine in a server-client network environment, or as a node in a peer-to-peer or distributed network environment. Machine 1400 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1400 is illustrated, the term "machine" includes a collection of machines that individually or jointly execute the instructions 1416.

The machine 1400 may include processors 1410, memory 1430, and I/O components 1450, which may be communicatively coupled via, for example, a bus 1402. The bus 1402 may include multiple buses coupling various elements of machine 1400 via various bus technologies and protocols. In an example, the processors 1410 (including, for example, a central processing unit (CPU), a graphics processing unit (GPU), a digital signal processor (DSP), an ASIC, or a suitable combination thereof) may include one or more processors 1412a to 1412n that may execute the instructions 1416 and process data. In some examples, one or more processors 1410 may execute instructions provided or identified by one or more other processors 1410. The term "processor" includes a multi-core processor including cores that may execute instructions contemporaneously. Although FIG. 14 shows multiple processors, the machine 1400 may include a single processor with a single core, a single processor with multiple cores (for example, a multi-core processor), multiple processors each with a single core, multiple processors each with multiple cores, or any combination thereof. In some examples, the machine 1400 may include multiple processors distributed among multiple machines.

The memory/storage 1430 may include a main memory 1432, a static memory 1434, or other memory, and a storage unit 1436, both accessible to the processors 1410 such as via the bus 1402. The storage unit 1436 and memory 1432, 1434 store instructions 1416 embodying any one or more of the functions described herein. The memory/storage 1430 may also store temporary, intermediate, and/or long-term data for processors 1410. The instructions 1416 may also reside, completely or partially, within the memory 1432, 1434, within the storage unit 1436, within at least one of the processors 1410 (for example, within a command buffer or cache memory), within memory at least one of I/O components 1450, or any suitable combination thereof, during execution thereof. Accordingly, the memory 1432, 1434, the storage unit 1436, memory in processors 1410, and memory in I/O components 1450 are examples of machine-readable medium.

As used herein, "machine-readable medium" refers to a device able to temporarily or permanently store instructions and data that cause machine 1400 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1416) for execution by a machine 1400 such that the instructions, when executed by one or more processors 1410 of the machine 1400, cause the machine 1400 to perform and one or more of the features described herein. Accordingly, a "machine-readable medium" may refer to a single storage device, as well as "cloud-based" storage systems or storage networks that include multiple storage apparatus or devices.

The I/O components 1450 may include a wide variety of hardware components adapted to receive input, provide output, produce output, transmit information, exchange information, capture measurements, and so on. The specific I/O components 1450 included in a particular machine will depend on the type and/or function of the machine. For example, mobile devices such as mobile phones may include a touch input device, whereas a headless server or IoT device may not include such a touch input device. The particular examples of I/O components illustrated in FIG. 14 are in no way limiting, and other types of components may be included in machine 1400. The grouping of I/O components 1450 are merely for simplifying this discussion, and the grouping is in no way limiting. In various examples, the I/O components 1450 may include user output components 1452 and user input components 1454. User output components 1452 may include, for example, display components for displaying information (for example, a liquid crystal display (LCD) or a projector), acoustic components (for example, speakers), haptic components (for example, a vibratory motor or force-feedback device), and/or other signal generators. User input components 1454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1450 may include biometric components 1456 and/or position components 1462, among a wide array of other environmental sensor components. The biometric components 1456 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1462 may include, for example, location sensors (for example, a Global Position System (GPS) receiver), altitude sensors (for example, an air pressure sensor from which altitude may be derived), and/or orientation sensors (for example, magnetometers).

The I/O components 1450 may include communication components 1464, implementing a wide variety of technologies operable to couple the machine 1400 to network(s) 1470 and/or device(s) 1480 via respective communicative couplings 1472 and 1482. The communication components 1464 may include one or more network interface components or other suitable devices to interface with the network (s) 1470. The communication components 1464 may include, for example, components adapted to provide wired communication, wireless communication, cellular communication, Near Field Communication (NFC), Bluetooth communication, Wi-Fi, and/or communication via other modalities. The device(s) 1480 may include other machines or various peripheral devices (for example, coupled via USB).

In some examples, the communication components 1464 may detect identifiers or include components adapted to detect identifiers. For example, the communication components 1464 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1464, such as, but not limited to, geo-location via Internet Protocol (IP) address, location via Wi-Fi, cellular, NFC, Bluetooth, or other wireless station identification and/or signal triangulation.

In the following, further features, characteristics and advantages of the disclosure will be described by means of items:

Item 1. A data processing system comprising:
at least one processor; and
a memory in communication with the at least one processor, the memory comprising executable instructions that, when executed by the processor alone or in combination with other processors, cause the data processing system to perform functions of:
receiving a query to be executed on column data of a column-oriented database, the column data including a number k of values, wherein the values are encoded using a data compression scheme such that each of the values is represented by an encoded value having a number n of bits, each of the encoded values being stored in a predetermined location in the memory;
processing the query to identify which of the values of the column data are to be accessed for the query;
generating a select bitmap having the number k bits wherein each bit corresponds to one of the values of the column, the select bitmap being generated such that each bit representing a value of the column data that is to be accessed for the query has a first value and each bit representing a value of the column data that is not to be accessed for the query has a second value;
extracting the encoded value from the memory for each of the values represented in the select bitmap by a bit having the first value;
decoding the extracted encoded values to generate decoded query data; and
processing the decoded query data based on the query to generate result data.

Item 2. The data processing system of item 1, wherein the encoded values are extracted from the memory using at least one instruction from a Bit Manipulation Instruction (BMI) set implemented in the processor.

Item 3. The data processing system of any of items 1-2, wherein the at least one instruction includes a parallel bit extract (PEXT) instruction which extracts bits selected by a select mask operand from a source operand and writes the extracted bits to contiguous low-order bits in a destination operand,
wherein the PEXT instruction is executed using the select bitmap as the select mask operand and the predetermined location in the memory as the source operand, and
wherein the destination operand comprises an output byte array.

Item 4. The data processing system of any of items 1-3, further comprising:
converting the select bitmap to an extended bitmap, wherein each of the bits in the select bitmap is represented by an n bit field in the extended bitmap such that the extended bitmap has k n bit fields, each bit in an n bit field having a same value as a value of the bit in the select bitmap represented by the n bit field,
wherein the encoded values are extracted from the memory based on the values of the bits in the extended bitmap.

Item 5. The data processing system of any of items 1-4, wherein the extended bitmap is generated using at least one instruction from a Bit Manipulation Instruction (BMI) set implemented in the processor,
wherein the at least one instruction includes a parallel bit deposit (PDEP) instruction which writes consecutive low order bits from a source operand to bit positions in a destination operand indicated by a select mask operand,
wherein a first PDEP instruction is executed using a first mask as the select mask operand and the select bitmap as the source operand, the first mask having k n bit fields, each n bit field in the first mask having a least significant bit set to 1 and n−1 high-order bits set to 0, the first PDEP instruction resulting in a first bitmap having k n bit fields, wherein a second PDEP instruction is executed using a second mask as the select mask operand and the select bitmap as the source operand, the second mask corresponding to the first mask-1, the second PDEP instruction resulting in a second bitmap having k n bit fields, wherein the first bitmap is subtracted from the second bitmap to generate the extended bitmap.

Item 6. A method for accessing column data of a column-oriented database system, the method comprising:

receiving a query to be executed on column data of a column-oriented database, the column data including a number k of values, wherein the values are encoded using a data compression scheme such that each of the values is represented by an encoded value having a number n of bits, each of the encoded values being stored in a predetermined location in a memory;

processing the query to identify which of the values of the column data are to be accessed for the query;

generating a select bitmap having the number k bits wherein each bit corresponds to one of the values of the column data, the select bitmap being generated such that each bit representing a value of the column data that is to be accessed for the query has a first value and each bit representing a value of the column data that is not to be accessed for the query has a second value;

extracting the encoded value from the memory for each of the values represented in the select bitmap by a bit having the first value;

decoding the extracted encoded values to generate decoded query data; and processing the decoded query data based on the query to generate result data.

Item 7. The method of item 6, wherein the encoded values are extracted from the memory using at least one instruction from a Bit Manipulation Instruction (BMI) set implemented in a processor.

Item 8. The method of any of items 6-7, wherein the at least one instruction includes a parallel bit extract (PEXT) instruction which extracts bits selected by a select mask operand from a source operand and writes the extracted bits to contiguous low-order bits in a destination operand, wherein the PEXT instruction is executed using the select bitmap as the select mask operand and the predetermined location in the memory as the source operand, and wherein the destination operand comprises an output byte array.

Item 9. The method of any of items 6-8, further comprising:

converting the select bitmap to an extended bitmap, wherein each of the bits in the select bitmap is represented by an n bit field in the extended bitmap such that the extended bitmap has k n bit fields, each bit in an n bit field having a same value as a value of the bit in the select bitmap represented by the n bit field, and wherein the encoded values are extracted from the memory based on the values of the bits in the extended bitmap.

Item 10. The method of any of items 6-9, wherein the extended bitmap is generated using at least one instruction from a Bit Manipulation Instruction (BMI) set implemented in a processor.

wherein the at least one instruction includes a parallel bit deposit (PDEP) instruction which writes consecutive low order bits from a source operand to bit positions in a destination operand indicated by a select mask operand, wherein a first PDEP instruction is executed using a first mask as the select mask operand and the select bitmap as the source operand, the first mask having k n bit fields, each n bit field in the first mask having a least significant bit set to 1 and n−1 high-order bits set to 0, the first PDEP instruction resulting in a first bitmap having k n bit fields, wherein a second PDEP instruction is executed using a second mask as the select mask operand and the select bitmap as the source operand, the second mask corresponding to the first mask-1, the second PDEP instruction resulting in a second bitmap having k n bit fields, and wherein the first bitmap is subtracted from the second bitmap to generate the extended bitmap.

Item 11. The method of any of items 6-10, wherein the column data is stored in the memory using a column-oriented storage format, and wherein the column-oriented storage format is Apache Parquet.

Item 12. A method of retrieving data from a column-oriented database, the method comprising:

receiving a query to be executed on the column-oriented database, all values in the column-oriented database being encoded, the query including a plurality of operations, the plurality of operations including a first filter operation and at least one other operation to be performed on columns of the column-oriented database;

performing the first filer operation on a first column designated by the query, the first filter operation including:

performing a first unpack operation on each of the encoded values in the first column to generate a first set of decoded values; and performing a first evaluate operation on each of the decoded values in the first set of decoded values to determine whether the decoded values satisfy a first filter condition and to generate a generate a first select bitmap including a number of bits corresponding to a number of values in the first set of decoded values, each bit in the first select bitmap having a first value for records having decoded values in the first designated column that satisfy the first filter condition and having a second value for records having decoded values in the first column that do not satisfy the first filter condition;

performing the at least one operation of the plurality of operations on at least a second column of the database, the at least one operation being one of a filter operation and a project operation and including:

performing a select operation that selects encoded values from the second column using the first select bitmap such that the encoded values for the records represented by bits in the first select bitmap having the first value are selected; and performing an unpack operation on each of the encoded values selected by the select operation to generate decoded values.

wherein the select operation is performed using a parallel bit extract (PEXT) instruction from a Bit Manipulation Instruction (BMI) which extracts bits selected by a select mask operand from a source operand and writes the extracted bits to contiguous low-order bits in a destination, and wherein the PEXT instruction is executed for the select operation using the first select bitmap as the select mask operand and a memory location of the second column as the source operand.

Item 13. The method of item 12, wherein the at least one operation is a filter operation and includes:

performing an evaluate operation on the decoded values that identifies each of the decoded values that satisfies a filter condition pertaining to the filter operation and generates a filtered bitmap including a number of bits corresponding to a number of decoded values that satisfy the filter condition, each bit in the filtered bitmap having the first value for the records having decoded values in the second column that satisfy the filter condition and having the second value for records having decoded values in the second column that do not satisfy the current filter condition; and performing a transform operation that transforms the filtered bitmap to a next select bitmap to be used by a next operation, the next select bitmap having a bit for each of the records in the column-oriented database, each bit in the second select bitmap having the first value for the records having the first value in the filtered bitmap and having the second value for all other records, wherein the transform operation is performed using a parallel bit deposit (PDEP) instruction from the BMI which writes consecutive low order bits from a source operand to bit positions in a destination operand indicated by a select mask operand, and wherein the PDEP instruction for the transform operation is executed using the first select bitmap as a select mask operand and the filtered bitmap as a source operand.

Item 14. The method of any of items 12-13, further comprising:

performing all remaining filter operations on the columns of the column-oriented database, each of the remaining operations including at least:

performing a current select operation that selects encoded values from a current column using a current select bitmap such that the encoded values for the records represented by bits in the current select bitmap having the first value are selected; and performing a current unpack operation on each of the encoded values selected by the select operation to generate current decoded values, performing a current evaluate operation that identifies each of the current decoded values that satisfies a current filter condition and generates a filtered bitmap including a number of bits corresponding to a number of values in the current set of decoded values, each bit in the filtered bitmap having the first value for the records having decoded values in the current column that satisfy the current filter condition and having the second value for records having decoded values in the current column that do not satisfy the current filter condition;

performing a current transform operation that transforms the filtered bitmap to the next select bitmap to be used by the next operation.

Item 15. The method of any of items 12-14, wherein the plurality of operations is performed in a predetermined order that is based at least in part on filter selectivity and bit widths of columns of the column-oriented database.

Item 16. The method of any of items 12-15, wherein the predetermined order is selected based on a cost model wherein a cost of each filter operation is a sum of a cost to run a select operator on all selected values, a cost to unpack and evaluate selected values, and a cost to transform a bitmap.

Item 17. The method of any of items 12-16, wherein the column-oriented database is implemented using Apache Parquet format such that each column is a triple including a repetition level, a definition level, and a field value, and further comprising:

performing the at least one select operation on a second column of the column-oriented database, the select operation including:

generating a first level bitmap from the first select bitmap using at least one parallel bit deposit (PDEP) instruction from the BMI, the first level bitmap being generated such that each bit in the first level bitmap has a first value for each repetition level and definition level that is to be selected and a second value for each repetition level and definition level that is not to be selected;

generating a first value bitmap by performing a PEXT instruction using the first level bitmap as the source operand;

selecting encoded repetition levels and encoded definition levels using the first level bitmap; and selecting encoded field values using the first value bitmap; and performing unpack operations on the selected encoded repetition levels, the selected encoded definition levels, and the selected encoded field values to generate decoded values.

18. The method of any of items 12-17, wherein generating the first level bitmap further comprises:

performing a first parallel bit deposit (PDEP) instruction from the BMI which writes consecutive low order bits from a source operand to bit positions in a destination operand indicated by a select mask operand, the first select bitmap being used as the source operand, a high operand is used as the destination operand, and a record bitmap is used as the select mask operand, the record bitmap having a first value where a first value of each of record in the column is located; and performing a second PDEP instruction where the first select bitmap is used as the source operand, a low operand is used as the destination operation, and the record bitmap-1 is used as the select mask operand, wherein the first level bitmap corresponds to the high operand minus the low operand, each bit in the first level bitmap having a first value for each definition level that is to be selected and a second value for each definition level that is not to be selected.

Item 19. The method of any of items 12-18, wherein generating the first value bitmap further comprises:
performing a PEXT instruction using the first level bitmap as the source operand, the first value bitmap as the destination bitmap, and a valid bitmap as the select mask, the valid bitmap indicating non-null values in the column, the valid bitmap having the first value for each repetition level to be selected and the second value for each repetition level that is not to be selected.

Item 20. The method of any of items 12-19, where selecting the encoded values further comprises:
selecting the encoded repetition levels and the encoded definition levels using the first level bitmap such that the encoded repetition levels and the encoded definition levels for records represented by bits in the first level bitmap having the first value are selected; and
selecting the encoded field values using the first value bitmap such that the encoded field values for records represented by bits in the first value bitmap having the first value are selected.
performing unpack operations on selected encoded repetition levels, encoded definition levels, and encoded field values to generate decoded values.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor alone or in combination with other processors, cause the data processing system to perform functions of:
receiving a query to be executed on a column-oriented database, the query being received from a client application, the column-oriented database including a plurality of columns, each of the columns including a number k of values, wherein the values are encoded using a data compression scheme such that each of the values is represented by an encoded value having a number n of bits, all encoded values for a column being stored contiguously with respect to each other in a predetermined location in the memory;

processing the query to identify which encoded values of the column data are to be accessed for the query using a database management system for the column-oriented database;

generating a select bitmap having the number k of bits wherein each bit represents a different encoded value of the column using the database management system, the select bitmap being generated such that each bit representing an encoded value of the column that is to be accessed for the query has a first value and each bit representing an encoded value of the column that is not to be accessed for the query has a second value;

extracting, using the database management system, the encoded values of the column from the memory which is represented by a bit in the select bitmap having the first value;

decoding, using the database management system, the extracted encoded values to generate decoded query data;

processing the decoded query data based on the query to generate result data; and returning the result data to the client application.

2. The data processing system of claim 1, wherein the encoded values are extracted from the memory using at least one instruction from a Bit Manipulation Instruction (BMI) set implemented in the processor.

3. The data processing system of claim 2, wherein the at least one instruction includes a parallel bit extract (PEXT) instruction which extracts bits selected by a select mask operand from a source operand and writes the extracted bits to contiguous low-order bits in a destination operand, wherein the PEXT instruction is executed using the select bitmap as the select mask operand and the predetermined location in the memory as the source operand, and wherein the destination operand comprises an output byte array.

4. The data processing system of claim 1, further comprising:

converting the select bitmap to an extended bitmap, wherein each of the bits in the select bitmap is represented by an n bit field in the extended bitmap such that the extended bitmap has k n bit fields, each bit in an n bit field having a same value as a value of the bit in the select bitmap represented by the n bit field, wherein the encoded values are extracted from the memory based on the values of the bits in the extended bitmap.

5. The data processing system of claim 4, wherein the extended bitmap is generated using at least one instruction from a Bit Manipulation Instruction (BMI) set implemented in the processor, wherein the at least one instruction includes a parallel bit deposit (PDEP) instruction which writes consecutive low order bits from a source operand to bit positions in a destination operand indicated by a select mask operand, wherein a first PDEP instruction is executed using a first mask as the select mask operand and the select bitmap as the source operand, the first mask having k n bit fields, each n bit field in the first mask having a least significant bit set to 1 and n−1 high-order bits set to 0, the first PDEP instruction resulting in a first bitmap having k n bit fields, wherein a second PDEP instruction is executed using a second mask as the select mask operand and the select bitmap as the source operand, the second mask corresponding to the first mask-1, the second PDEP instruction resulting in a second bitmap having k n bit fields, and wherein the first bitmap is subtracted from the second bitmap to generate the extended bitmap.

6. A method for accessing column data of a column-oriented database system, the method comprising:

receiving a query to be executed on a column-oriented database, the query being received from a client application, the column-oriented database including a plurality of columns, each of the columns including a number k of values, wherein the values are encoded using a data compression scheme such that each of the values is represented by an encoded value having a number n of bits, all encoded values for a column being stored contiguously with respect to each other in a predetermined location in a memory;

processing the query to identify which encoded values of the column are to be accessed for the query using a database management system for the column-oriented database;

generating a select bitmap having the number k of bits wherein each bit represents a different encoded value of the column using the database management system, the select bitmap being generated such that each bit representing an encoded value of the column that is to be accessed for the query has a first value and each bit representing an encoded value of the column that is not to be accessed for the query has a second value;

extracting, using the database management system, the encoded values of the column from the memory which is represented by a bit in the select bitmap having the first value;

decoding, using the database management system, the extracted encoded values to generate decoded query data;

processing the decoded query data based on the query to generate result data; and returning the result data to the client application.

7. The method of claim 6, wherein the encoded values are extracted from the memory using at least one instruction from a Bit Manipulation Instruction (BMI) set implemented in a processor.

8. The method of claim 7, wherein the at least one instruction includes a parallel bit extract (PEXT) instruction which extracts bits selected by a select mask operand from a source operand and writes the extracted bits to contiguous low-order bits in a destination operand, wherein the PEXT instruction is executed using the select bitmap as the select mask operand and the predetermined location in the memory as the source operand, and wherein the destination operand comprises an output byte array.

9. The method of claim 6, further comprising:

converting the select bitmap to an extended bitmap, wherein each of the bits in the select bitmap is represented by an n bit field in the extended bitmap such that the extended bitmap has k n bit fields, each bit in an n bit field having a same value as a value of the bit in the select bitmap represented by the n bit field, wherein the encoded values are extracted from the memory based on the values of the bits in the extended bitmap.

10. The method of claim 9, wherein the extended bitmap is generated using at least one instruction from a Bit Manipulation Instruction (BMI) set implemented in a processor,
   wherein the at least one instruction includes a parallel bit deposit (PDEP) instruction which writes consecutive low order bits from a source operand to bit positions in a destination operand indicated by a select mask operand,
   wherein a first PDEP instruction is executed using a first mask as the select mask operand and the select bitmap as the source operand, the first mask having k n bit fields, each n bit field in the first mask having a least significant bit set to 1 and n-1 high-order bits set to 0, the first PDEP instruction resulting in a first bitmap having k n bit fields,
   wherein a second PDEP instruction is executed using a second mask as the select mask operand and the select bitmap as the source operand, the second mask corresponding to the first mask-1, the second PDEP instruction resulting in a second bitmap having k n bit fields, and
   wherein the first bitmap is subtracted from the second bitmap to generate the extended bitmap.

11. The method of claim 6, wherein the column is stored in the memory using a column-oriented storage format, and
   wherein the column-oriented storage format is implemented such that each column is a triple including a repetition level, a definition level, and a field value.

12. A method of retrieving data from a column-oriented database, the method comprising:
   receiving a query to be executed on the column-oriented database at a database management system for the column-oriented database, all values in the column-oriented database being encoded, the query including a plurality of operations, the plurality of operations including a first filter operation and at least one other operation to be performed on columns of the column-oriented database;
   performing the first filer filter operation on a first column designated by the query using the database management system, the first filter operation including:
      performing a first unpack operation on each of the encoded values in the first column to generate a first set of decoded values using the database management system; and
      performing a first evaluate operation on each decoded value in the first set of decoded values using the database management system to determine whether the decoded value satisfies a first filter condition and to generate a generate a first select bitmap including a number of bits corresponding to a number of decoded values in the first set of decoded values, each bit in the first select bitmap having a first value for records having a decoded value in the first column that satisfies the first filter condition and having a second value for records having a decoded value in the first column that does not satisfy the first filter condition;
   performing the at least one other operation of the plurality of operations on at least a second column of the column-oriented database using the database management system, the at least one other operation being one of a filter operation and a project operation and including:
      performing a select operation using the database management system that selects encoded values from the second column using the first select bitmap such that the encoded values for the records represented by bits in the first select bitmap having the first value are selected; and
      performing a second unpack operation on each of the encoded values selected by the select operation to generate decoded values using the database management system; and
   processing the decoded values based on the query to generate result data for the query using the database management system,
   wherein the select operation is performed using a parallel bit extract (PEXT) instruction from a Bit Manipulation Instruction (BMI) which extracts bits selected by a select mask operand from a source operand and writes the extracted bits to contiguous low-order bits in a destination, and
   wherein the PEXT instruction is executed for the select operation using the first select bitmap as the select mask operand and a memory location of the second column as the source operand.

13. The method of claim 12, wherein the at least one other operation is the filter operation and includes:
   performing an evaluate operation on the decoded values that identifies each of the decoded values that satisfies a filter condition pertaining to the filter operation and generates a filtered bitmap including the number of bits corresponding to the number of decoded values that satisfy the filter condition, each bit in the filtered bitmap having the first value for the records having decoded values in the second column that satisfy the filter condition and having the second value for records having decoded values in the second column that do not satisfy the filter condition; and
   performing a transform operation that transforms the filtered bitmap to a next select bitmap to be used by a next operation, the next select bitmap having a bit for each of the records in the column-oriented database, each bit in the next select bitmap having the first value for the records having the first value in the filtered bitmap and having the second value for all other records,
   wherein the transform operation is performed using a parallel bit deposit (PDEP) instruction from the BMI which writes consecutive low order bits from a source operand for the PDEP instruction to bit positions in a destination operand indicated by a select mask operand for the PDEP instruction, and
   wherein the PDEP instruction for the transform operation is executed using the first select bitmap as the select mask operand and the filtered bitmap as the source operand.

14. The method of claim 13, further comprising:
   performing all remaining filter operations on the columns of the column-oriented database, each of the remaining operations including at least:
      performing a current select operation that selects encoded values from a current column using a current select bitmap such that the encoded values for the records represented by bits in the current select bitmap having the first value are selected;
      performing a current unpack operation on each of the encoded values selected by the select operation to generate current decoded values;
      performing a current evaluate operation that identifies each of the current decoded values that satisfies a current filter condition and generates a filtered bitmap including a number of bits corresponding to a number of values in the current decoded values, each bit in the filtered bitmap having the first value for the records having decoded values in the current column that satisfy the current filter condition and having the second value for records having decoded values in the current column that do not satisfy the current filter condition; and performing a current transform operation that transforms the filtered bitmap to the next select bitmap to be used by the next operation.

15. The method of claim 14, wherein the plurality of operations is performed in a predetermined order that is based at least in part on filter selectivity and bit widths of columns of the column-oriented database.

16. The method of claim 15, wherein the predetermined order is selected based on a cost model wherein a cost of each filter operation is a sum of a cost to run a select operator on all selected values, a cost to unpack and evaluate selected values, and a cost to transform a bitmap.

17. The method of claim 12, wherein the column-oriented database is implemented such that each column is a triple including a repetition level, a definition level, and a field value, and further comprising:
performing a second select operation on the second column of the column-oriented database, the second select operation including:
generating a first level bitmap from the first select bitmap using at least one parallel bit deposit (PDEP) instruction from the BMI, the first level bitmap being generated such that each bit in the first level bitmap has the first value for each repetition level and definition level that is to be selected and the second value for each repetition level and definition level that is not to be selected;
generating a first value bitmap by performing a PEXT instruction using the first level bitmap as the source operand;
selecting encoded repetition levels and encoded definition levels using the first level bitmap;
selecting encoded field values using the first value bitmap; and
performing unpack operations on the selected encoded repetition levels, the selected encoded definition levels, and the selected encoded field values to generate the decoded values.

18. The method of claim 17, wherein generating the first level bitmap further comprises:
performing a first parallel bit deposit (PDEP) instruction from the BMI which writes consecutive low order bits from a source operand to bit positions in a destination operand indicated by a select mask operand, the first select bitmap being used as the source operand, a high operand is used as the destination operand, and a record bitmap is used as the select mask operand, the record bitmap having the first value where a first value of each of record in the column is located; and
performing a second PDEP instruction where the first select bitmap is used as the source operand, a low operand is used as the destination operation, and the record bitmap-1 is used as the select mask operand,
wherein the first level bitmap corresponds to the high operand minus the low operand, each bit in the first level bitmap having the first value for each definition level that is to be selected and the second value for each definition level that is not to be selected.

19. The method of claim 18, wherein generating the first value bitmap further comprises:
performing a PEXT instruction using the first level bitmap as the source operand, the first value bitmap as the destination operand, and a valid bitmap as the select mask operand, the valid bitmap indicating non-null values in the column, the valid bitmap having the first value for each repetition level to be selected and the second value for each repetition level that is not to be selected.

20. The method of claim 19, wherein selecting the encoded values further comprises:
selecting the encoded repetition levels and the encoded definition levels using the first level bitmap such that the encoded repetition levels and the encoded definition levels for records represented by bits in the first level bitmap having the first value are selected;
selecting the encoded field values using the first value bitmap such that the encoded field values for records represented by bits in the first value bitmap having the first value are selected, and
performing unpack operations on selected encoded repetition levels, encoded definition levels, and encoded field values to generate decoded values.

* * * * *